US008631076B1

(12) United States Patent
Auerbach et al.

(10) Patent No.: US 8,631,076 B1
(45) Date of Patent: Jan. 14, 2014

(54) METHODS AND SYSTEMS FOR ASSOCIATING INSTANT MESSENGER EVENTS

(75) Inventors: David Benjamin Auerbach, Brooklyn, NY (US); Ninlane Wang, Santa Clara, CA (US); Nikhil Bhatla, Sunnyvale, CA (US); Omar Habib Khan, Toronto (CA)

(73) Assignee: Google Inc., Mountain View, CA (US)

( * ) Notice: Subject to any disclaimer, the term of this patent is extended or adjusted under 35 U.S.C. 154(b) by 1961 days.

(21) Appl. No.: 10/880,865

(22) Filed: Jun. 30, 2004

Related U.S. Application Data

(63) Continuation-in-part of application No. 10/814,766, filed on Mar. 31, 2004, and a continuation-in-part of application No. 10/815,071, filed on Mar. 31, 2004.

(51) Int. Cl.
*G06F 15/173* (2006.01)

(52) U.S. Cl.
USPC .......................................................... 709/206

(58) Field of Classification Search
USPC .......................... 709/206, 217, 227; 707/102
See application file for complete search history.

(56) References Cited

U.S. PATENT DOCUMENTS

| | | | |
|---|---|---|---|
| 4,410,957 A | 10/1983 | Cason et al. | |
| 5,280,612 A | 1/1994 | Lorie et al. | |
| 5,305,205 A | 4/1994 | Weber | |
| 5,321,838 A | 6/1994 | Hensley et al. | |
| 5,539,809 A | 7/1996 | Mayer et al. | |
| 5,555,346 A | 9/1996 | Gross et al. | |
| 5,566,336 A | 10/1996 | Futatsugi et al. | |
| 5,592,378 A | 1/1997 | Cameron et al. | |
| 5,623,652 A | 4/1997 | Vora et al. | |
| 5,701,469 A | 12/1997 | Brandli et al. | |
| 5,742,816 A | 4/1998 | Barr et al. | |
| 5,748,954 A | 5/1998 | Mauldin | |
| 5,781,192 A | 7/1998 | Kodimer | |
| 5,793,948 A | 8/1998 | Asahi et al. | |
| 5,819,273 A | 10/1998 | Vora et al. | |
| 5,845,300 A | 12/1998 | Comer et al. | |
| 5,872,976 A | 2/1999 | Yee et al. | |
| 5,881,315 A | 3/1999 | Cohen | |
| 5,907,836 A | 5/1999 | Sumita et al. | |
| 5,913,208 A | 6/1999 | Brown et al. | |
| 5,940,594 A | 8/1999 | Ali et al. | |
| 5,956,722 A | 9/1999 | Jacobson et al. | |

(Continued)

FOREIGN PATENT DOCUMENTS

| | | |
|---|---|---|
| EP | 1209866 A2 | 5/2002 |
| JP | 2000-099441 | 4/2000 |

(Continued)

OTHER PUBLICATIONS

Bengel, Jason et al., "Archiving and Indexing Chat Utterances," 2003 Electrical Enginnering and Computer Science and Information Technology Telecommunicaitons Center University of Kansas.*

(Continued)

*Primary Examiner* — Kevin Bates
(74) *Attorney, Agent, or Firm* — Fenwick & West LLP

(57) ABSTRACT

Systems and methods for associating instant messenger events are described. In one embodiment, a first instant messenger event is identified. It may then be determined whether the first instant messenger event is associated with at least a previously indexed second instant messenger event based, at least in part, on a relevance measure.

20 Claims, 5 Drawing Sheets

(56) References Cited

U.S. PATENT DOCUMENTS

| | | |
|---|---|---|
| 5,961,610 A | 10/1999 | Kelly et al. |
| 5,964,839 A | 10/1999 | Johnson et al. |
| 6,006,222 A | 12/1999 | Culliss |
| 6,014,665 A | 1/2000 | Culliss |
| 6,026,388 A | 2/2000 | Liddy et al. |
| 6,029,195 A | 2/2000 | Herz |
| 6,055,579 A | 4/2000 | Goyal et al. |
| 6,073,130 A | 6/2000 | Jacobson et al. |
| 6,078,916 A | 6/2000 | Culliss |
| 6,092,101 A | 7/2000 | Birrell et al. |
| 6,115,802 A | 9/2000 | Tock et al. |
| 6,119,147 A | 9/2000 | Toomey et al. |
| 6,175,830 B1 | 1/2001 | Maynard |
| 6,182,065 B1 | 1/2001 | Yeomans |
| 6,182,068 B1 | 1/2001 | Culliss |
| 6,184,880 B1 | 2/2001 | Okada |
| 6,188,277 B1 | 2/2001 | Borodulin et al. |
| 6,199,067 B1 | 3/2001 | Geller |
| 6,202,065 B1 | 3/2001 | Wills |
| 6,209,000 B1 | 3/2001 | Klein et al. |
| 6,226,630 B1 * | 5/2001 | Billmers ............... 707/3 |
| 6,236,768 B1 | 5/2001 | Rhodes et al. |
| 6,236,978 B1 | 5/2001 | Tuzhilin |
| 6,240,548 B1 | 5/2001 | Holzle et al. |
| 6,269,369 B1 | 7/2001 | Robertson |
| 6,275,820 B1 | 8/2001 | Navin-Chandra et al. |
| 6,275,957 B1 | 8/2001 | Novik et al. |
| 6,282,548 B1 | 8/2001 | Burner et al. |
| 6,321,228 B1 | 11/2001 | Crandall et al. |
| 6,330,589 B1 | 12/2001 | Kennedy |
| 6,341,371 B1 | 1/2002 | Tandri |
| 6,346,952 B1 | 2/2002 | Shtivelman |
| 6,347,374 B1 | 2/2002 | Drake et al. |
| 6,349,299 B1 | 2/2002 | Spencer et al. |
| 6,363,373 B1 | 3/2002 | Steinkraus |
| 6,370,563 B2 | 4/2002 | Murakami et al. |
| 6,380,924 B1 | 4/2002 | Yee et al. |
| 6,393,421 B1 | 5/2002 | Paglin |
| 6,393,438 B1 | 5/2002 | Kathrow et al. |
| 6,401,239 B1 | 6/2002 | Miron |
| 6,446,076 B1 | 9/2002 | Burkey et al. |
| 6,477,585 B1 | 11/2002 | Cohen et al. |
| 6,480,837 B1 | 11/2002 | Dutta |
| 6,487,555 B1 | 11/2002 | Bharat |
| 6,490,577 B1 | 12/2002 | Anwar |
| 6,513,036 B2 | 1/2003 | Fruensgaard et al. |
| 6,526,405 B1 * | 2/2003 | Mannila et al. ............ 707/6 |
| 6,532,023 B1 | 3/2003 | Schumacher et al. |
| 6,560,655 B1 | 5/2003 | Grambihler et al. |
| 6,564,213 B1 | 5/2003 | Ortega et al. |
| 6,581,056 B1 | 6/2003 | Rao |
| 6,592,627 B1 * | 7/2003 | Agrawal et al. ........... 715/234 |
| 6,604,236 B1 | 8/2003 | Draper et al. |
| 6,631,345 B1 | 10/2003 | Schumacher et al. |
| 6,658,423 B1 | 12/2003 | Pugh et al. |
| 6,662,226 B1 | 12/2003 | Wang et al. |
| 6,681,247 B1 | 1/2004 | Payton |
| 6,684,250 B2 | 1/2004 | Anderson et al. |
| 6,691,175 B1 | 2/2004 | Lodrige et al. |
| 6,694,353 B2 | 2/2004 | Sommerer |
| 6,697,838 B1 | 2/2004 | Jakobson |
| 6,707,471 B2 | 3/2004 | Funaki |
| 6,708,293 B2 | 3/2004 | Kaler et al. |
| 6,728,763 B1 | 4/2004 | Chen |
| 6,772,143 B2 * | 8/2004 | Hung ............... 707/3 |
| 6,779,030 B1 | 8/2004 | Dugan et al. |
| 6,782,381 B2 | 8/2004 | Nelson et al. |
| 6,820,075 B2 | 11/2004 | Shanahan et al. |
| 6,826,553 B1 | 11/2004 | DaCosta et al. |
| 6,850,934 B2 | 2/2005 | Bates et al. |
| 6,853,950 B1 | 2/2005 | O'Reilly et al. |
| 6,864,901 B2 | 3/2005 | Chang et al. |
| 6,865,715 B2 * | 3/2005 | Uchino et al. ............ 715/277 |
| 6,873,982 B1 | 3/2005 | Bates et al. |
| 6,877,027 B1 | 4/2005 | Spencer et al. |
| 6,879,691 B1 | 4/2005 | Koretz |
| 6,901,378 B1 | 5/2005 | Linker et al. |
| 6,907,577 B2 | 6/2005 | Tervo |
| 6,934,740 B1 | 8/2005 | Lawande et al. |
| 6,957,229 B1 | 10/2005 | Dyor |
| 6,963,830 B1 | 11/2005 | Nakao |
| 6,968,509 B1 | 11/2005 | Chang et al. |
| 6,981,040 B1 | 12/2005 | Konig et al. |
| 6,983,310 B2 | 1/2006 | Rouse et al. |
| 6,985,913 B2 | 1/2006 | Murata |
| 6,999,957 B1 | 2/2006 | Zamir et al. |
| 7,016,919 B2 | 3/2006 | Cotton et al. |
| 7,080,073 B1 | 7/2006 | Jiang et al. |
| 7,096,255 B2 | 8/2006 | Malik |
| 7,099,887 B2 | 8/2006 | Hoth et al. |
| RE39,326 E | 10/2006 | Comer et al. |
| 7,162,473 B2 | 1/2007 | Dumais et al. |
| 7,188,316 B2 | 3/2007 | Gusmorino et al. |
| 7,200,802 B2 | 4/2007 | Kawatani |
| 7,219,184 B2 | 5/2007 | Stojancic |
| 7,233,948 B1 | 6/2007 | Shamoon et al. |
| 7,240,049 B2 | 7/2007 | Kapur |
| 7,245,910 B2 | 7/2007 | Osmo |
| 7,249,158 B2 | 7/2007 | Naitou |
| 7,257,822 B1 | 8/2007 | Sambhus et al. |
| 7,265,858 B2 | 9/2007 | Park et al. |
| 7,328,242 B1 * | 2/2008 | McCarthy et al. ............ 709/204 |
| 7,330,536 B2 * | 2/2008 | Claudatos et al. ............ 379/68 |
| 7,337,448 B1 | 2/2008 | Dalia et al. |
| 7,343,365 B2 | 3/2008 | Farnham et al. |
| 7,346,613 B2 | 3/2008 | Hurst-Hiller et al. |
| 7,370,035 B2 | 5/2008 | Gross et al. |
| 7,376,640 B1 | 5/2008 | Anderson et al. |
| 7,383,307 B2 * | 6/2008 | Kirkland et al. ............ 709/206 |
| 7,412,491 B2 * | 8/2008 | Gusler et al. ............... 709/207 |
| 7,437,444 B2 | 10/2008 | Houri |
| 7,441,246 B2 | 10/2008 | Auerbach et al. |
| 7,457,872 B2 | 11/2008 | Aton et al. |
| 7,467,390 B2 | 12/2008 | Gilgen et al. |
| 7,475,406 B2 | 1/2009 | Banatwala et al. |
| 7,499,974 B2 | 3/2009 | Karstens |
| 7,500,249 B2 | 3/2009 | Kampe et al. |
| 7,516,118 B1 | 4/2009 | Badros et al. |
| 7,546,602 B2 | 6/2009 | Hejlsberg et al. |
| 7,562,367 B1 | 7/2009 | Arad |
| 7,577,667 B2 | 8/2009 | Hinshaw et al. |
| 7,602,382 B2 | 10/2009 | Hinckley et al. |
| 7,634,546 B1 | 12/2009 | Strickholm et al. |
| 7,650,403 B2 | 1/2010 | Koetke et al. |
| 7,676,553 B1 | 3/2010 | Laucius et al. |
| 7,941,439 B1 | 5/2011 | Lawrence et al. |
| 8,099,407 B2 | 1/2012 | Auerbach et al. |
| 8,386,728 B1 | 2/2013 | Ionescu et al. |
| 2001/0002469 A1 | 5/2001 | Bates et al. |
| 2001/0016852 A1 | 8/2001 | Peairs et al. |
| 2001/0049677 A1 | 12/2001 | Talib et al. |
| 2002/0042789 A1 | 4/2002 | Michalewicz et al. |
| 2002/0049608 A1 | 4/2002 | Hartsell et al. |
| 2002/0055844 A1 | 5/2002 | L'Esperance et al. |
| 2002/0056089 A1 | 5/2002 | Houston |
| 2002/0059245 A1 | 5/2002 | Zakharov et al. |
| 2002/0059265 A1 | 5/2002 | Valorose, III |
| 2002/0059425 A1 | 5/2002 | Belfiore et al. |
| 2002/0065802 A1 | 5/2002 | Uchiyama |
| 2002/0073076 A1 | 6/2002 | Xu et al. |
| 2002/0078256 A1 | 6/2002 | Gehman et al. |
| 2002/0087507 A1 | 7/2002 | Hopewell et al. |
| 2002/0091568 A1 | 7/2002 | Kraft et al. |
| 2002/0091972 A1 | 7/2002 | Harris et al. |
| 2002/0103664 A1 | 8/2002 | Olsson et al. |
| 2002/0116291 A1 | 8/2002 | Grasso et al. |
| 2002/0138467 A1 | 9/2002 | Jacobson et al. |
| 2002/0156760 A1 | 10/2002 | Lawrence et al. |
| 2002/0165903 A1 | 11/2002 | Zargham et al. |
| 2002/0174101 A1 | 11/2002 | Fernley et al. |
| 2002/0178383 A1 | 11/2002 | Hrabik et al. |
| 2002/0184224 A1 | 12/2002 | Haff et al. |
| 2002/0184406 A1 | 12/2002 | Aliffi |
| 2003/0001854 A1 | 1/2003 | Jade et al. |

(56) References Cited

U.S. PATENT DOCUMENTS

| | | |
|---|---|---|
| 2003/0018521 A1 | 1/2003 | Kraft et al. |
| 2003/0023586 A1 | 1/2003 | Knorr |
| 2003/0028506 A1 | 2/2003 | Yu |
| 2003/0028896 A1 | 2/2003 | Swart et al. |
| 2003/0036848 A1 | 2/2003 | Sheha et al. |
| 2003/0036914 A1 | 2/2003 | Fitzpatrick et al. |
| 2003/0041112 A1 | 2/2003 | Tada et al. |
| 2003/0050909 A1 | 3/2003 | Preda et al. |
| 2003/0050966 A1 | 3/2003 | Dutta et al. |
| 2003/0055816 A1 | 3/2003 | Paine et al. |
| 2003/0055828 A1 | 3/2003 | Koch et al. |
| 2003/0083947 A1 | 5/2003 | Hoffman et al. |
| 2003/0088433 A1 | 5/2003 | Young et al. |
| 2003/0097361 A1 | 5/2003 | Huang et al. |
| 2003/0123442 A1 | 7/2003 | Drucker et al. |
| 2003/0123443 A1 | 7/2003 | Anwar |
| 2003/0126136 A1 | 7/2003 | Omoigui |
| 2003/0130984 A1 | 7/2003 | Quinlan et al. |
| 2003/0131000 A1 | 7/2003 | Bates et al. |
| 2003/0131061 A1 | 7/2003 | Newton et al. |
| 2003/0149694 A1 | 8/2003 | Ma et al. |
| 2003/0154071 A1 | 8/2003 | Shreve |
| 2003/0154293 A1 | 8/2003 | Zmolek |
| 2003/0167266 A1 | 9/2003 | Saldanha et al. |
| 2003/0182480 A1 | 9/2003 | Varma et al. |
| 2003/0185379 A1 | 10/2003 | O'Connor et al. |
| 2003/0187837 A1 | 10/2003 | Culliss |
| 2003/0212654 A1 | 11/2003 | Harper et al. |
| 2003/0233366 A1 | 12/2003 | Kesselman et al. |
| 2003/0233419 A1 | 12/2003 | Beringer |
| 2004/0002959 A1 | 1/2004 | Alpert et al. |
| 2004/0003038 A1 | 1/2004 | Huang et al. |
| 2004/0031027 A1 | 2/2004 | Hiltgen |
| 2004/0044962 A1 | 3/2004 | Green et al. |
| 2004/0054737 A1* | 3/2004 | Daniell ............ 709/206 |
| 2004/0064447 A1 | 4/2004 | Simske et al. |
| 2004/0093317 A1 | 5/2004 | Swan |
| 2004/0095852 A1 | 5/2004 | Griner et al. |
| 2004/0098609 A1 | 5/2004 | Bracewell et al. |
| 2004/0103409 A1 | 5/2004 | Hayner et al. |
| 2004/0128285 A1 | 7/2004 | Green et al. |
| 2004/0133560 A1 | 7/2004 | Simske |
| 2004/0133561 A1 | 7/2004 | Burke |
| 2004/0141594 A1 | 7/2004 | Brunson et al. |
| 2004/0143569 A1 | 7/2004 | Gross et al. |
| 2004/0155910 A1 | 8/2004 | Chang et al. |
| 2004/0168150 A1 | 8/2004 | Ziv |
| 2004/0186848 A1 | 9/2004 | Kobashikawa et al. |
| 2004/0186896 A1 | 9/2004 | Daniell et al. |
| 2004/0187075 A1 | 9/2004 | Maxham et al. |
| 2004/0193596 A1 | 9/2004 | Defelice et al. |
| 2004/0203642 A1 | 10/2004 | Zatloufai et al. |
| 2004/0205773 A1 | 10/2004 | Carcido et al. |
| 2004/0215715 A1 | 10/2004 | Ehrich et al. |
| 2004/0230572 A1 | 11/2004 | Omoigui |
| 2004/0235520 A1 | 11/2004 | Cadiz et al. |
| 2004/0254928 A1 | 12/2004 | Vronay et al. |
| 2004/0254938 A1 | 12/2004 | Marcjan et al. |
| 2004/0255301 A1 | 12/2004 | Turski et al. |
| 2004/0261026 A1 | 12/2004 | Corson |
| 2004/0267700 A1 | 12/2004 | Dumais et al. |
| 2004/0267756 A1 | 12/2004 | Bayardo et al. |
| 2005/0021542 A1 | 1/2005 | Irle et al. |
| 2005/0033803 A1 | 2/2005 | Vleet et al. |
| 2005/0050547 A1 | 3/2005 | Whittle et al. |
| 2005/0057584 A1 | 3/2005 | Gruen et al. |
| 2005/0060310 A1 | 3/2005 | Tong et al. |
| 2005/0060719 A1 | 3/2005 | Gray et al. |
| 2005/0076115 A1 | 4/2005 | Andrews et al. |
| 2005/0080792 A1 | 4/2005 | Ghatare |
| 2005/0080866 A1 | 4/2005 | Kent et al. |
| 2005/0108213 A1 | 5/2005 | Riise et al. |
| 2005/0108332 A1* | 5/2005 | Vaschillo et al. ............ 709/206 |
| 2005/0114021 A1 | 5/2005 | Krull et al. |
| 2005/0114487 A1 | 5/2005 | Peng et al. |
| 2005/0165777 A1 | 7/2005 | Hurst-Hiller et al. |
| 2005/0192921 A1 | 9/2005 | Chaudhuri et al. |
| 2005/0216482 A1 | 9/2005 | Ponessa |
| 2005/0251526 A1 | 11/2005 | Nayak |
| 2005/0262073 A1 | 11/2005 | Reed et al. |
| 2006/0031365 A1 | 2/2006 | Kay et al. |
| 2006/0085750 A1 | 4/2006 | Easton, et al. |
| 2006/0100912 A1 | 5/2006 | Kumar et al. |
| 2006/0106778 A1 | 5/2006 | Baldwin |
| 2006/0167704 A1 | 7/2006 | Nicholls et al. |
| 2006/0190470 A1 | 8/2006 | Lemnotis |
| 2006/0224553 A1 | 10/2006 | Chtcherbatchenko et al. |
| 2006/0288075 A1 | 12/2006 | Wu |
| 2007/0016556 A1 | 1/2007 | Ann et al. |
| 2007/0022155 A1 | 1/2007 | Owens et al. |
| 2007/0033275 A1 | 2/2007 | Toivonen et al. |
| 2007/0055689 A1 | 3/2007 | Rhoads et al. |
| 2007/0078860 A1 | 4/2007 | Enenkiel |
| 2007/0208697 A1 | 9/2007 | Subramaniam et al. |

FOREIGN PATENT DOCUMENTS

| | | |
|---|---|---|
| JP | 2001-5705 | 1/2001 |
| JP | 2003-242176 | 8/2003 |
| JP | 2003-296365 | 10/2003 |
| JP | 2004-062451 | 2/2004 |
| RU | 2138076 C1 | 9/1999 |
| WO | WO 01/62004 A2 | 8/2001 |
| WO | WO 02/069118 | 9/2002 |
| WO | WO 2005/006129 A2 | 1/2005 |

OTHER PUBLICATIONS

U.S. Appl. No. 10/814,773, filed Mar. 31, 2004, Lawrence et al.

"About Spector CNE," Spectorsoft, 1 page, [online] [Retrieved on May 23, 2007] Retrieved from the Internet: URL: http://www.spectorsoft.com/products/spectorcne_windows/help/v40/webhelp/About_Spector_CNE>.

Knezevic, P. et al., "The Architecture of the Obelix—An Improved Internet Search Engine," Proceedings of the 33$^{rd}$ Annual Hawaii International Conference on System Sciences (HICSS) Jan. 4-7, 2000, Maui, HI, USA, pp. 2145-2155.

Morita, M. et al., "Information Filtering Based on User Behavior Analysis and Best Match Text Retrieval," Proceedings of the Annual International ACM-SIGIR Conference on Research and Development in Information Retrieval, Dublin, Jul. 3-6, 1994, pp. 272-281.

"Spector Corporate Network Edition 4.0 (Spector CNE) Online User Manual," SpectorSoft Corporation, 2003, [online] [retrieved on May 12, 2005] Retrieved from the Internet: <URL: http://www.spectorsoft.com/products/spectorcne_windows/help/v40/webhelp/>.

International Preliminary Report on Patentabiity, PCT/US2005/003386, Jun. 24, 2005, 8 pages.

International Search Report and Written Opinion, PCT/US2005/003386, Jun. 28, 2005.

International Search Report and Written Opinion, PCT/US2005/010985, Apr. 26, 2007, 9 pages.

International Search Report and Written Opinion, PCT/US2004/038562, Apr. 6, 2005.

U.S. Appl. No. 10/749,440, filed Dec. 31, 2003, Badros et al.

80-20 Software—Products—80-20 One Search, http://www.80-20.com/products/one-search/retrieverasp, printed Mar. 16, 2004.

"askSam™ Making Information Useful," askSam,—Organize your information with askSam, http://www.asksam.com/brochure.asp, printed Mar. 15, 2004.

Alexa® Web Search—Toolbar Quick Tour, http://pages.alexa.com/prod_serv/quicktour.html, pp. 1-5, printed Mar. 16, 2004.

Barrett, R. et al., "How to Personalize the Web," IBM Research, http://www.almaden.ibm.com/cs/wbi/papers/chi97/wbioaner.html pp. 1-13, printed Mar. 16, 2004.

Battelle, J., CNN.com "When geeks go camping, ideas hatch," http://www.cnn.com/2004/Tech/ptech/01/09/bus2.feat.geek.camp/index.html, pp. 1-3, printed Jan. 13, 2004.

Boyan, J., et al., "A Machine Learning Architecture for Optimizing Web Search Engines," School of Computer Science, Carnegie Mellon University, May 10, 1996, pp. 1-8.

(56) References Cited

OTHER PUBLICATIONS

Bradenbaugh, F., "Chapter 1 The Client-Side Search Engine," JavaScript Cookbook, 1<sup>st</sup> Ed., Oct. 1999, O'Reilly™ Online Catalog, http://www.oreilly.com/catalog/jscook/chapter/ch01.html, pp. 1-30, printed Dec. 29, 2003.
Brin, S., et al, "The Anatomy of a Large-Scale Hypertextual Web Search Engine," htto://www7.scu.edu.au/programme/fullpapers/1921/com1921.htm pp. 1-18, 1998.
Budzik, J., et al., User Interactions with Everyday Applications as Context for Just-in-time Information Access, Intelligent Information Laboratory, Northwestern University, pp. 1-8, no date.
DEVONthink, http://www.devon-techonoloqies.com/products/devonthink.ohp, printed Mar. 16, 2004.
dtSearch®—http://www.dtsearch.com/ printed Mar. 15, 2004.
Dumais, S., et al, "Stuff I've Seen: A System for Personal Information Retrieval and Re-Use," Microsoft Research, *SIGIR '03*, Jul. 28-Aug. 1, 2003, pp. 1-8.
Enfish, http://www.enfish.com, printed Mar. 16, 2004.
Fast Search & Transfer—Home—Enterprise Search, http://solutions.altavista.com/en/news/pr_020402_desktop.shtmu, printed Mar. 16, 2004.
Fertig, S., et al., "Lifestreams: An Alternative to the Desktop Metaphor," http://www.acm.ora/siochi/chi96/proceedinqs/videos/Fertici/etf.htm, pp. 1-3, printed Mar. 16, 2004.
Geisler, G., "Enriched Links: A Framework for Improving Web Navigation Using Pop-Up Views," pp. 1-14, 2000.
ISYS Search Software—ISYS: desktop, http://www.isysusa.com/products/desktop/index.html, printed Mar. 16, 2004.
Joachims, T., et al., "WebWatcher: A Tour Guide for the World Wide Web," 1996.
Markoff, J., "Google Moves Toward Clash with Microsoft," *The New York Times*, May 19, 2004, http://www.nytimes.com/2004/5/19/technology/19google.html?ex=1085964389&ei=1&e . . . , pp. 1-4, printed May 19, 2004.
Naraine, R., "Future of Search Will Make You Dizzy," Enterprise, May 20, 2004, http://www.internetnews.com/ent-news/article.pho/3356831, pp. 1-4, printed May 21, 2004.
"Overview," Stuff I've Seen—Home Page, http://research.Microsoft.com/adapt/sis/index.htm, pp. 1-2, printed May 26, 2004.
Rhodes, B., "Margin Notes Building a Contextually Aware Associative Memory," *The Proceedings of the International Conference on Intelligent User Interfaces (IUI '00)*, Jan. 9-12, 2000.
Rhodes, B., et al., "Just-in-time information retrieval agents," *Systems Journal*, vol. 39, Nos. 3&4, 2000, pp. 685-704.
Rhodes, B., et al., "Remembrance Agent—A continuously running automated information retrieval system," *The Proceedings of the First International Conference on the Practical Application of Intelligent Agents and Multi Agent Technology (PAAM '96)*, pp. 487-495.
Rizzo, T., "WinFS 101: Introducing the New Windows File System," Longhorn Developer Center Home: Headline Archive: WinFS 101: Introducing the New . . . , http://msdn.Microsoft.com/Longhorn/archive/default.aspx?pull+/library/en-us/dnwinfs/htm . . . , pp. 1-5, printed Apr. 21, 2004.
"Searching for the next Google — New trends are helping nimble startups elbow in to the plundered market," Red Herring — the Business of Technology, Mar. 9, 2004, http://redherrinq.com/PrintArticle.aspx?a=4782&sector=Caoital, pg. 1-5, printed Mar. 30, 2004.
"Selecting Task-Relevant Sources for Just-In-Time Retrieval," pp. 1-3, no. date.
Sherman, C., "HotBot's New Desktop Search Toolbar," www.searchenginewatch.com, htto://searchenqinewatch.com/searchdav/print.pho/34711 339921 pp. 1-3, printed Apr. 14, 2004.
"Standardization Priorities for the Directory — Directory Interoperability Forum White Paper," the Open Group, Dec. 2001, pp. 1-21.
Sullivan, D., "Alta Vista Releases Search Software," the Search Engine Report, Aug. 4, 1998, pp. 1-2.
WebWatcher Home p., "Welcome to the WebWatcher Project," http://www-2.cs.cmu.edu/—webwatcher/,.printed Oct. 15, 2003.
"WhenU Just-In-Time Marketing," http://www.whenu.com printed Mar. 19, 2004.
X1 instantly searches files & email. For outlook, Outlook, http://www.x1.com/ printed Mar. 15, 2004.
Zellweger, P., et al., "Fluid Links for Informed and Incremental Link Transitions," Proceedings of Hypertext'98, Pittsburgh, Pa, Jun. 20-24, 1998, pp. 50-57.
Huang, Q., et al., Multimedia Search and Retrieval: New Concepts, System Implementation, and Application, Circuits and Systems for Video Technology, IEEE Transaction s on Circuits and Systems for Video Technology, Aug. 2000, pp. 679-692, vol. 10. Issue 5.
Pingali, G. S., et al., "Instantly Indexed Multimedia Databases of Real World Events," IEEE Transactions on Multimedia, Jun. 2002, pp. 269-282, vol. 4, Issue 2.
Sengupta, S., et al., Designing a Value Based Niche Search Engine Using Evolutionary Strategies, Proceedings of the International Conference of Information Technology: Coding and Computing (ITCC'05), IEEE, 2005, Pennsylvania State University.
PCT International Search Report and Written Opinion, PCT/US05/10687, Sep. 10, 2008, 14 Pages.
PCT International Search Report and Written Opinion, PCT/US05/10685, Jul. 3, 2008, 11 Pages.
Examination Report, European Patent Application No. 05731427.0, Jul. 28, 2008, 5 Pages.
European Examination Report, European Application No. EP 05731490.8, Jul. 7, 2008, 5 Pages.
European Search Report, European Application No. EP 05731490.8, Apr. 28, 2008, 4 Pages.
Bacon, J. et al., "Event Storage and Federation Using ODMG," 2000, pp. 265-281, vol. 2135, [online] Retrieved from the Internet<URL: http://citeseer.ist.psu.edu/bacon00event.html>.
Spiteri, M.D. et al., "An Architecture to Support Storage and Retrieval of Events," Sep. 1998, pp. 443-458, [online] Retrieved from the Internet<URL:http://citeseerist.psu.edu/spiteri98architecture.html>.
Spiteri, M.D., "An Architecture for the Notification, Storage and Retrieval of Events," Jan. 2000, pp. 1-165 pages, [online] Retrieved from the Internet<URL:http://citeseerist.psu.edu/spiteri00architecture.html>.
Jonathan Bennett & AutoIt Team, "AutoIt v3 Homepage," Version v3.0.102, 1999-2004, 26 pages, [online] [Archived on Aug. 13, 2004; Retrieved on Dec. 2, 2008] Retrieved from the internet <URL:http://web.archive.org/web/20040813195143/http://www.autoitscript.com/autoit3/docs/>.
Budzik, J., "Information access in context," Knowledge-Based Systems, Elsevier 2001, pp. 37-53, vol. 14.
Gemmell, J., et al., "Living with a Lifetime Store," Proc. ATR Workshop on Ubiquitous Experience Media, Sep. 9-10, 2003, pp. 69-76.
Gemmell, J., et al., "The MyLifeBits Lifetime Store," Proceedings of the 2003 ACM SIGMM Workshop on Experimental Telepresence, Nov. 7, 2003, pp. 80-83.
Rekimoto, J., "Time-Machine Computing: A Time-centric Approach for the Information Environment," Proceedings of the Annual ACM Symposium on User Interface Software and Technology, Nov. 7, 1999, pp. 1-10.

\* cited by examiner

METHODS AND SYSTEMS FOR ASSOCIATING INSTANT MESSENGER EVENTS

RELATED APPLICATIONS

This application is a continuation-in-part of co-pending application Ser. No. 10/814,766, filed Mar. 31, 2004, entitled "METHODS AND SYSTEMS FOR PROCESSING INSTANT MESSENGER MESSAGES," and Ser. No. 10/815,071, filed Mar. 31, 2004, entitled "METHODS AND SYSTEMS FOR STRUCTURING EVENT DATA IN A DATABASE FOR LOCATION AND RETRIEVAL," the disclosures of which are incorporated herein by reference.

FIELD OF THE INVENTION

The invention generally relates to search engines. More particularly, the invention relates to methods and systems for associating instant messenger events.

BACKGROUND OF THE INVENTION

Users may generate and access a large number of articles, such as emails, web pages, word processing documents, spreadsheet documents, instant messenger messages, and presentation documents, using a client device, such as a personal computer, personal digital assistant, or mobile phone. Some articles are stored on one or more storage devices coupled to, accessible by, or otherwise associated with the client device(s). Users may sometimes wish to search the storage device(s) for articles.

Generally, search engines do not index instant messenger messages and/or allow a user to search instant messenger messages. Some applications exist that store and/or log a user's instant messages, but these applications generally do not index the user's instant messenger messages. Generally, search engines may not group logged instant messages into conversations, and a user may not be able to search for conversations of associated instant messages.

Additionally, conventional client-device search applications can require an explicit search query from a user to generate results, and may be limited to file names or the contents of a particular application's files.

SUMMARY

Embodiments of the present invention comprise methods and systems for associating instant messenger (IM) events. One embodiment comprises identifying a first instant messenger event, and determining whether the first instant messenger event is associated with at least a previously indexed second instant messenger event based, at least in part, on a relevance measure.

This embodiment is mentioned not to limit or define the invention, but to provide an example of an embodiment of the invention to aid understanding thereof. Illustrative embodiments are discussed in the Detailed Description, and further description of the invention is provided there. Advantages offered by the various embodiments of the present invention may be further understood by examining this specification.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION OF SPECIFIC EMBODIMENTS

Overview

Embodiments of the present invention provide methods and systems for associating instant messenger events. A variety of methods and systems may be implemented according to the present invention, and they may operate in a variety of environments. There are multiple embodiments of the present invention. By way of introduction and example, the subject matter of the invention in one embodiment may relate to indexing and storing the text of a person's Instant Messenger conversations as they occur over a period of weeks. These conversations may be indexed and stored on the hard drive of the person's personal computer in a way that identifies conversations, conversation threads, common subjects, and/or common participants within the Instant Messenger messages that have occurred over a period of time. For example, a conversation about the World Series between two fans may occur over a two-day period from October 21 to October 22. All of the instant messages relating to this conversation may be identified in the index as a conversation having a common subject and participants.

As another example, a conversation occurring August 12 that is responsive to questions asked during a conversation that occurred the previous day, August 11, may be identified in the index as associated with a common conversation thread. The person whose conversations were indexed and stored may then use a search application on their computer to search for related instant messages, conversations, conversation threads, and the like. The search application can return the search results in a manner that correlates the conversations, and allows the user to easily follow conversations, conversation threads, or otherwise read related messages. This introduction is given to introduce the reader to the general subject matter of the invention. By no means is the invention limited to such subject matter. Illustrative embodiments are described below.

System Architecture

Figure 1:
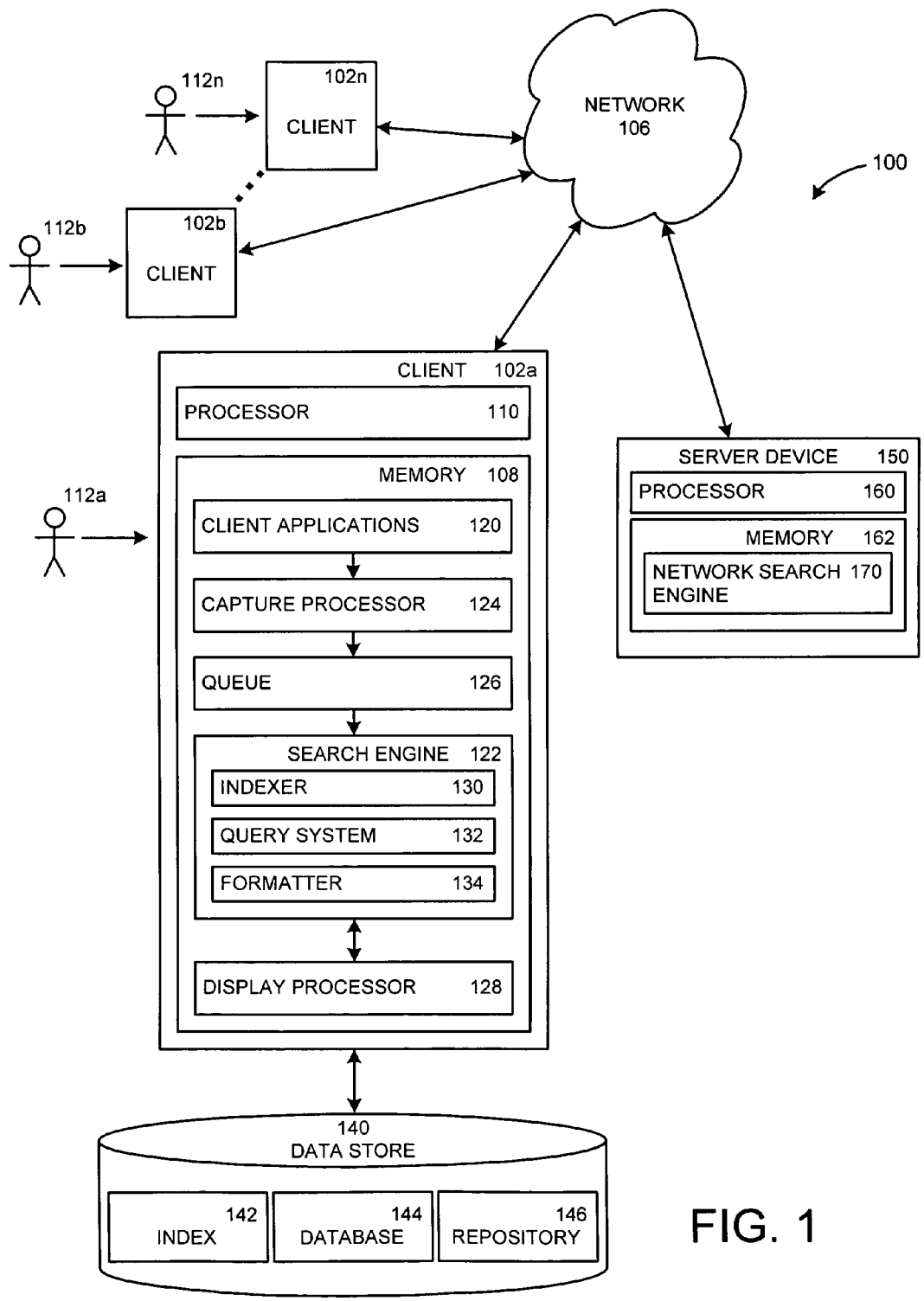
FIG. 1 is a diagram illustrating an illustrative environment in which one embodiment of the present invention may operate.

Referring now to the drawings in which like numerals indicate like elements throughout the several figures, FIG. 1 is a block diagram illustrating an illustrative environment for implementation of an embodiment of the present invention. While the environment shown in FIG. 1 reflects a client-side search engine architecture embodiment, other embodiments are possible. The system 100 shown in FIG. 1 includes multiple client devices 102a-n that can communicate with a server device 150 over a network 106. The network 106 shown in FIG. 1 comprises the Internet. In other embodiments, other networks, such as an intranet, may be used instead. Moreover, methods according to the present invention may operate within a single client device that does not communicate with a server device or a network.

The client devices 102a-n shown in FIG. 1 each include a computer-readable medium 108. The embodiment shown in FIG. 1 includes a random access memory (RAM) 108 coupled to a processor 110. The processor 110 executes computer-executable program instructions stored in memory 108. Such processors may include a microprocessor, an ASIC, state machines, or other processor, and can be any of a number of suitable computer processors, such as processors from Intel Corporation of Santa Clara, Calif. and Motorola Corporation of Schaumburg, Ill. Such processors include, or may be in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor, such as the processor 110 of client 102a, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, and JavaScript.

Client devices 102a-n can be coupled to a network 106, or alternatively, can be stand alone machines. Client devices 102a-n may also include a number of external or internal devices such as a mouse, a CD-ROM, DVD, a keyboard, a display device, or other input or output devices. Examples of client devices 102a-n are personal computers, digital assistants, personal digital assistants, cellular phones, mobile phones, smart phones, pagers, digital tablets, laptop computers, Internet appliances, and other processor-based devices. In general, the client devices 102a-n may be any type of processor-based platform that operates on any suitable operating system, such as Microsoft® Windows® or Linux, capable of supporting one or more client application programs. For example, the client device 102a can comprise a personal computer executing client application programs, also known as client applications 120. The client applications 120 can be contained in memory 108 and can include, for example, a word processing application, a spreadsheet application, an email application, an instant messenger application, a presentation application, an Internet browser application, a calendar/organizer application, a video playing application, an audio playing application, an image display application, a file management program, an operating system shell, and other applications capable of being executed by a client device. Client applications may also include client-side applications that interact with or accesses other applications (such as, for example, a web-browser executing on the client device 102a that interacts with a remote e-mail server to access e-mail).

The user 112a can interact with the various client applications 120 and articles associated with the client applications 120 via various input and output devices of the client device 102a. Articles include, for example, word processor documents, spreadsheet documents, presentation documents, emails, instant messenger messages, database entries, calendar entries, appointment entries, task manager entries, source code files, and other client application program content, files, messages, items, web pages of various formats, such as HTML, XML, XHTML, Portable Document Format (PDF) files, and media files, such as image files, audio files, and video files, or any other documents or items or groups of documents or items or information of any suitable type whatsoever.

The user's 112a interaction with articles, the client applications 120, and the client device 102a creates event data that may be observed, recorded, analyzed or otherwise used. An event can be any occurrence possible associated with an article, client application 120, or client device 102a, such as inputting text in an article, displaying an article on a display device, sending an article, receiving an article, manipulating an input device, opening an article, saving an article, printing an article, closing an article, opening a client application program, closing a client application program, idle time, processor load, disk access, memory usage, bringing a client application program to the foreground, changing visual display details of the application (such as resizing or minimizing) and any other suitable occurrence associated with an article, a client application program, or the client device whatsoever. Additionally, event data can be generated when the client device 102a interacts with an article independent of the user 112a, such as when receiving an email or performing a scheduled task.

The memory 108 of the client device 102a can also contain a capture processor 124, a queue 126, and a search engine 122. The client device 102a can also contain or is in communication with a data store 140. The capture processor 124 can capture events and pass them to the queue 126. The queue 126 can pass the captured events to the search engine 122 or the search engine 122 can retrieve new events from the queue 126. In one embodiment, the queue 126 notifies the search engine 122 when a new event arrives in the queue 126 and the search engine 122 retrieves the event (or events) from the queue 126 when the search engine 122 is ready to process the event (or events). When the search engine receives an event it can be processed and can be stored in the data store 140. The search engine 122 can receive an explicit query from the user 112a or generate an implicit query and it can retrieve information from the data store 140 in response to the query. In another embodiment, the queue is located in the search engine 122. In still another embodiment, the client device 102a does not have a queue and the events are passed from the capture processor 124 directly to the search engine 122. According to other embodiments, the event data is transferred using an information exchange protocol. The information exchange protocol can comprise, for example, any suitable rule or convention facilitating data exchange, and can include, for example, any one of the following communication mechanisms: Extensible Markup Language—Remote Procedure Calling protocol (XML/RPC), Hypertext Transfer Protocol (HTTP), Simple Object Access Protocol (SOAP), shared memory, sockets, local or remote procedure calling, or any other suitable information exchange mechanism.

The capture processor 124 can capture an event by identifying and compiling event data associated with an event. Examples of events include sending or receiving an instant messenger message, a user viewing a web page, saving a word processing document, printing a spreadsheet document, inputting text to compose or edit an email, opening a presentation application, closing an instant messenger application, entering a keystroke, moving the mouse, and hovering the mouse over a hyperlink. An example of event data captured by the capture processor 124 for an event involving the receipt of an instant messenger message by the user 112a can comprise the sender of the message, the recipients of the message, the time and date the message was received, the content of the message, a file associated with the message, and a conversation identifier. A conversation identifier can be used to associate messages that form a conversation and can be provided by the instant messenger application or can be generated by the capture processor 124. A conversation can be one or more messages between the user 112a and at least one other user until the user 112a logs out of or closes the instant messenger application or the instant messenger application is inactive for a certain period of time (for example, 30 minutes).

In the embodiment shown in FIG. 1, the capture processor 124 comprises multiple capture components. For example, the capture processor 124 shown in FIG. 1 comprises a separate capture component for each client application in order to capture events associated with each application. The capture processor 124 can also comprises a separate capture component that monitors overall network activity in order to capture event data associated with network activity, such as the receipt or sending of an instant messenger message. The capture processor 124 shown in FIG. 1 also can comprise a separate client device capture component that monitors overall client device performance data, such as processor load, idle time, disk access, the client applications in use, and the amount of memory available. The capture processor 124 shown in FIG. 1 also comprises a separate capture component to monitor and capture keystrokes input by the user and a separate capture component to monitor and capture items, such as text, displayed on a display device associated with the client device 102a. An individual capture component can monitor multiple client applications and multiple capture components can monitor different aspects of a single client application.

In one embodiment, the capture processor 124, through the individual capture components, can monitor activity on the client device and can capture events by a generalized event definition and registration mechanism, such as an event schema. Each capture component can define its own event schema or can use a predefined one. Event schema can differ depending on the client application or activity the capture component is monitoring. Generally, the event schema can describe the format for an event, for example, by providing fields for event data associated with the event (such as the time of the event) and fields related to any associated article (such as the title) as well as the content of any associated article (such as the document body). An event schema can describe the format for any suitable event data that relates to an event. For example, an event schema for an instant messenger message event sent by the user 112a can include a recipient or list of recipients, the time sent, the date sent, content of the message, a file associated with the message, and a conversation identifier. An event schema for a web page currently being viewed by a user can include the Uniform Resource Locator or URL of the web page, the time being viewed, and the content of the web page. An event schema for a word processing document being saved by a user can include the title of the document, the time saved, the location of the document, the format of the document, the text of the document, and a pointer to the location of the document. More generally, an event schema can describe the state of the system around the time of the event. For example, an event schema can contain a URL for a web page event associated with a previous web page that the user navigated from. In addition, an event schema can describe fields with more complicated structure like lists. For example, an event schema can contain fields that list multiple recipients. An event schema can also contain optional fields so that an application can include additional event data if desired. An event can be captured by compiling event data into fields described by an associated event schema.

The capture processor 124 can capture events occurring presently (or "real-time events") and can capture events that have occurred in the past (or "historical events"). Real-time events can be "indexable" or "non-indexable". In one embodiment, the search engine 122 indexes indexable real-time events, but does not index non-indexable real-time events. The search engine 122 may determine whether to index an event based on the importance of the event. Indexable real-time events can be more important events associated with an article, such as viewing a web page, loading or saving a file, and receiving or sending an instant message or email. Non-indexable events can be deemed not important enough by the search engine 122 to index and store the event, such as moving the mouse or selecting a portion of text in an article. Non-indexable events can be used by the search engine 122 to update the current user state. While all real-time events can relate to what the user is currently doing (or the current user state), indexable real-time events can be indexed and stored in the data store 140. Alternatively, the search engine 122 can index all real-time events. Real-time events can include, for example, sending or receiving an article, such as an instant messenger message, examining a portion of an article, such as selecting a portion of text or moving a mouse over a portion of a web page, changing an article, such as typing a word in an email or pasting a sentence in a word processing document, closing an article, such as closing an instant messenger display area or changing an email message being viewed, loading, saving, opening, or viewing an article, such as a word processing document, web page, or email, listening to or saving an MP3 file or other audio/video file, or updating the metadata of an article, such as book marking a web page, printing a presentation document, deleting a word processing document, or moving a spreadsheet document.

Historical events are similar to indexable real-time events except that the event occurred before the installation of the search engine 122 or was otherwise not captured, because, for example, the search engine 122 was not operational for a period of time while the client device 102a was operational or because no capture component existed for a specific type of historical event at the time the event took place. Examples of historical events include the user's saved word processing documents, media files, presentation documents, calendar entries, and spreadsheet documents, the emails in a user's inbox, and the web pages book marked by the user. The capture processor 124 can capture historical events by periodically crawling the memory 108 and any associated data storage device for events not previously captured by the capture processor 124. The capture processor 124 can also capture historical events by requesting certain client applications, such as a web browser or an email application, to retrieve articles and other associated information. For example, the capture processor 124 can request that the web browser application obtain all viewed web pages by the user or request that the email application obtain all email messages associated with the user. These articles may not currently exist in memory 108 or on a storage device of the client device 102a. For example, the email application may have to retrieve emails from a server device. In one embodiment, the search engine 122 indexes historical events.

In the embodiment shown in FIG. 1, events captured by the capture processor 124 are sent to the queue 126 in the format described by an event schema. The capture processor 124 can also send performance data to the queue 126. Examples of performance data include current processor load, average processor load over a predetermined period of time, idle time, disk access, the client applications in use, and the amount of memory available. Performance data can also be provided by specific performance monitoring components, some of which may be part of the search engine 122, for example. The performance data in the queue 126 can be retrieved by the search engine 122 and the capture components of the capture processor 124. For example, capture components can retrieve the performance data to alter how many events are sent to the queue 126 or how detailed the events are that are sent (fewer or smaller events when the system is busy) or how frequently events are sent (events are sent less often when the system is busy or there are too many events waiting to be processed). The search engine 122 can use performance data to determine when it indexes various events and when and how often it issues implicit queries.

In one embodiment, the queue 126 holds events until the search engine 122 is ready to process an event or events. Alternatively, the queue 126 uses the performance data to help determine how quickly to provide the events to the search engine 122. The queue 126 can comprise one or more separate queues including a user state queue and an index queue. The index queue can queue indexable events, for example. Alternatively, the queue 126 can have additional queues or comprise a single queue. The queue 126 can be implemented as a circular priority queue using memory mapped files. The queue can be a multiple-priority queue where higher priority events are served before lower priority events, and other components may be able to specify the type of events they are interested in. Generally, real-time events can be given higher priority than historical events, and indexable events can be given higher priority than non-indexable real-time events. Other implementations of the queue 126 are possible. In another embodiment, the client device 102a does not have a queue 126. In this embodiment, events are passed directly from the capture processor 124 to the search engine 122. In other embodiments, events can be transferred between the capture components and the search engine using suitable information exchange mechanisms such as: Extensible Markup Language—Remote Procedure Calling protocol (XML/RPC), Hypertext Transfer Protocol (HTTP), Simple Object Access Protocol (SOAP), shared memory, sockets, local or remote procedure calling, or any other suitable information exchange mechanism.

The search engine 122 can contain an indexer 130, a query system 132, and a formatter 134. The query system 132 can retrieve all real-time events and performance data from the queue 126. The query system 132 can use performance data and real-time events to update the current user state and generate an implicit query. An implicit query can be an automatically generated query based on the current user state. The query system 132 can also receive and process explicit queries from the user 112a. Performance data can also be retrieved by the search engine 122 from the queue 126 for use in determining the amount of activity possible by the search engine 122.

In the embodiment shown in FIG. 1, indexable real-time events and historical events (indexable events) are retrieved from the queue 126 by the indexer 130. Alternatively, the queue 126 may send the indexable events to the indexer 130. The indexer 130 can index the indexable events and can send them to the data store 140 where they are stored. The data store 140 can be any type of computer-readable media and can be integrated with the client device 102a, such as a hard drive, or external to the client device 102a, such as an external hard drive or on another data storage device accessed through the network 106. The data store can be one or more logical or physical storage areas. In one embodiment, the data store 140 can be in memory 108. The data store 140 may facilitate one or combination of methods for storing data, including without limitation, arrays, hash tables, lists, and pairs, and may include compression and encryption. In the embodiment shown in FIG. 1, the data store comprises an index 142, a database 144 and a repository 146.

The data store 140 comprises a local index. The local index in the embodiment shown in FIG. 1 may comprise information, such as articles, which are associated with the client device 102a, a user 112a of the client device 102a, or a group of users of the client device 102a. For example, the local index in the data store 140 shown in FIG. 1 may comprise an index of articles created, edited, received, or stored by the client user 112a using the client machine 102a, or articles otherwise associated with the client user 102a or the client machine 112a. The local index may be stored in a client machine, such as in data store 140, in a data store on a local network in a manner accessible by the client machine, on a server accessible to the client machine through the Internet, or in another accessible location.

In contrast, a global index may comprise information relevant to many users or many servers, such as, for example, an index of web pages located on multiple servers in communication with the World Wide Web. One example of a global index is an index used by the Google™ search engine to provide search results in response to a search query.

A single index may comprise both a local and a global index. For example, in one embodiment, an index may comprise both local and global information, and include a user or client identifier with the local information so that it may be identified with the user(s) or client(s) to which it pertains. Moreover, an index, local or global, may be present in one or multiple logical or physical locations.

In the embodiment shown in FIG. 1, when the indexer 130 receives an event, the indexer 130 can determine, from the event schema, terms (if any) associated with the event, the time of the event (if available), images (if any) associated with the event, and/or other information defining the event. The indexer 130 can also determine if the event relates to other events and associate the event with related events. For example, for a received instant messenger message event, the indexer can associate the message event with other message events from the same conversation. The messages from the same conversation can be associated with each other in a conversation object, which can be stored in the data store 140.

The indexer 130 can send and incorporate the terms and times, associated with the event in the index 142 of the data store 140. The event can be sent to the database 144 for storage and the content of the associated article and any associated images can be stored in the repository 146. The conversation object associated with instant messenger messages can be stored in the database 144.

In the embodiment shown in FIG. 1, a user 112a can input an explicit query into a search engine interface displayed on the client device 102a, which is received by the search engine 122. The search engine 122 can also generate an implicit query based on a current user state, which can be determined by the query system 132 from real-time events. Based on the query, the query system 132 can locate relevant information in the data store 140 and provide a result set. In one embodiment, the result set comprises article identifiers for articles associated with the client applications 120 or client articles. Client articles include articles associated with the user 112a or client device 102a, such as the user's emails, word processing documents, instant messenger messages, previously viewed web pages and any other article or portion of an article associated with the client device 102a or user 112a. An article identifier may be, for example, a Uniform Resource Locator (URL), a file name, a link, an icon, a path for a local file, or other suitable information that may identify an article. In another embodiment, the result set also comprises article identifiers for articles located on the network 106 or network articles located by a search engine on a server device. Network articles include articles located on the network 106 not previously viewed or otherwise referenced by the user 112a, such as web pages not previously viewed by the user 112a.

The formatter 134 can receive the search result set from the query system 132 of the search engine 122 and can format the results for output to a display processor 128. In one embodiment, the formatter 134 can format the results in XML, HTML, or tab delineated text. The display processor 128 can be contained in memory 108 and can control the display of the result set on a display device associated with the client device 102a. The display processor 128 may comprise various components. For example, in one embodiment, the display processor 128 comprises a Hypertext Transfer Protocol (HTTP) server that receives requests for information and responds by constructing and transmitting Hypertext Markup Language (HTML) pages. In one such embodiment, the HTTP server comprises a scaled-down version of the Apache Web server. The display processor 128 can be associated with a set of APIs to allow various applications to receive the results and display them in various formats. The display APIs can be implemented in various ways, including, as, for example, DLL exports, COM interface, VB, JAVA, or .NET libraries, or as a web service.

Through the client devices 102a-n, users 112a-n can communicate over the network 106, with each other and with other systems and devices coupled to the network 106. As shown in FIG. 1, a server device 150 can be coupled to the network 106. In the embodiment shown in FIG. 1, the search engine 122 can transmit a search query comprised of an explicit or implicit query or both to the server device 150. The user 112a can also enter a search query in a search engine interface, which can be transmitted to the server device 150 by the client device 102a via the network 106. In another embodiment, the query signal may instead be sent to a proxy server (not shown), which then transmits the query signal to server device 150. Other configurations are also possible.

The server device 150 can include a server executing a search engine application program, such as the Google™ search engine. In other embodiments, the server device 150 can comprise a related information server or an advertising server. Similar to the client devices 102a-n, the server device 150 can include a processor 160 coupled to a computer-readable memory 162. Server device 150, depicted as a single computer system, may be implemented as a network of computer processors. Examples of a server device 150 are servers, mainframe computers, networked computers, a processor-based device, and similar types of systems and devices. The server processor 160 can be any of a number of computer processors, such as processors from Intel Corporation of Santa Clara, Calif. and Motorola Corporation of Schaumburg, Ill. In another embodiment, the server device 150 may exist on a client-device. In still another embodiment, there can be multiple server devices 150.

Memory 162 contains the search engine application program, also known as a search engine 170. The search engine 170 can locate relevant information from the network 106 in response to a search query from a client device 102a. The search engine 170 then can provide a result set to the client device 102a via the network 106. The result set can comprise one or more article identifiers. An article identifier may be, for example, a Uniform Resource Locator (URL), a file name, a link, an icon, a path for a local file, or anything else that identifies an article. In one embodiment, an article identifier can comprise a URL associated with an article.

In one embodiment, the server device 150, or related device, has previously performed a crawl of the network 106 to locate articles, such as web pages, stored at other devices or systems coupled to the network 106, and indexed the articles in memory 162 or on another data storage device. It should be appreciated that other methods for indexing articles in lieu of or in combination with crawling may be used, such as manual submission.

It should be noted that other embodiments of the present invention may comprise systems having different architecture than that which is shown in FIG. 1. For example, in some other embodiments of the present invention, the client device 102a is a stand-alone device and is not coupled to a network. The system 100 shown in FIG. 1 is merely illustrative, and is used to explain the illustrative methods shown in FIGS. 2 through 5.

Process

Various methods in accordance with embodiments of the present invention may be carried out. Methods according to the present invention may be implemented by, for example, a processor-executable program code stored on a computer-readable medium.

For example, in one embodiment, an instant messenger event may be captured by compiling event data associated with at least one instant messenger message, the instant messenger event may be associated with a conversation, and at least some of the event data associated with the instant messenger event may be indexed. In one embodiment, a search query may be received, and the conversation may be identified as relevant to the search query.

In one embodiment, capturing the instant messenger event may comprise identifying an activity associated with an instant messenger application on a client device, identifying the instant messenger event, and compiling the instant messenger event from at least some of the event data. The event data can comprise one or more of sender data, recipient data, a time associated with the event, a date associated with the event, a file associated with the event (such as a file attachment), and content from the instant messenger message associated with the event. Indexing at least some of the event data can comprise associating an event identifier with the event and associating the event identifier with at least some of the event data. The instant messenger event is captured on a client device or in another embodiment on a network device.

In one embodiment, the instant messenger event can be compiled upon the sending or receipt of an instant messenger message. The instant messenger event can be compiled after a period of time. The period of time can be predetermined or it can be a period of inactivity on the instant messenger application.

In one embodiment, identifying instant messenger activity can comprise one or more of identifying instant messenger network activity, identifying a user interface change associated with an instant messenger application, and determining that the instant messenger application is active. In one embodiment, identifying an instant messenger event can comprise monitoring the instant messenger application for an ongoing period of time or analyzing a current state of the instant messenger application to identify the instant messenger event. Identifying the instant messenger event can comprise one or more of identifying a display area associated with the instant messenger application and determining the content of the display area, monitoring operating system calls made by the instant messenger application to display text, hooking into the instant messenger application's notification application program interface, directly querying the instant messenger application, and extracting text from a display area associated with the instant messenger application.

In one embodiment, associating a first instant messenger event with a conversation may comprise determining if an existing conversation identifier associated with an existing conversation relevant to the first instant messenger event exists. In one such embodiment, the first instant messenger event may be associated with the existing conversation identifier if the associated existing conversation is determined to be relevant to the first instant messenger event. In the event that the first instant messenger event is determined to be irrelevant to any existing conversation, the first conversation identifier may be, in one embodiment, associated with a new conversation identifier. In one such embodiment, a determination of whether a conversation identifier associated with a conversation relevant to the first instant messenger event exists may be based, at least in part, on instant messenger participants, such as the sender or recipient of the first instant message, and a time the first instant message was received or sent. In one embodiment, a conversation identifier, such as a title, associated with an instant messenger conversation may be determined. For example, in one such embodiment, a conversation identifier may be automatically determined based, at least in part, on based on the content of the conversation.

In order to associate instant messenger (IM) events into instant messenger conversations with associated conversation identifiers, a determination of whether a particular captured, received, and/or identified instant messenger event is relevant to and/or associated with any previously indexed instant messenger events may be made. One embodiment comprises identifying a first instant messenger event, and determining whether the first instant messenger event is associated with at least a previously indexed second instant messenger event. For example, one such embodiment may comprise determining whether the identified first instant messenger event is associated with a plurality of instant messenger events (including a previously indexed second instant messenger event) associated with a common conversation identifier.

The terms first and second are used here merely to differentiate one item from another item. The terms first and second are not used to indicate first or second in time, or first or second in a list, or other order, unless explicitly noted. For example, the "second" may come in time or in list before the "first," unless it is otherwise explicitly indicated.

In one embodiment, a first instant messenger event may be identified upon receipt. In another embodiment, a first instant messenger event may be identified from among a plurality of previously indexed instant messenger events. The determination of whether a first instant messenger event is associated with at least a second instant messenger event may be based, at least in part, on a relevance measure. For example, in one embodiment, the first instant messenger event may be associated with a conversation identifier associated with the second instant messenger event if the relevance measure exceeds a threshold value.

In one embodiment, a determination of whether a first identified instant messenger event is associated with a conversation may be based, at least in part, on a determination of whether the first instant messenger event comprises the same or a substantially similar display area identifier as other events associated with the conversation. For example, in one embodiment, if a first user is sending instant messages to a second user using a first display area, all the messages sent between the first and second users using the first display area may be determined to belong to the same conversation, and may be associated with a common conversation identifier. If the first user closes the first display area, and/or subsequently begins to send instant messages to the second user using a second display area, the messages sent using the second display area may be determined to belong to a different conversation than the messages sent using the first display area. In one such embodiment, a relevance measure may be based, at least in part, on whether an identified first instant messenger event comprises the same or a substantially similar display area identifier as at least a previously indexed second instant messenger event, and/or a conversation identifier.

If the first instant messenger event is associated with the conversation identifier associated with the previously indexed second instant messenger event, the first instant messenger event may then be indexed, and event data associated with the first instant messenger event may be stored in a data store. One embodiment of the present invention may comprise determining whether the first instant messenger event is associated with a plurality of previously indexed instant messenger events. In one such embodiment, if the relevance measure between the first and second instant messenger events does not meet or exceed the threshold value, it may be determined whether the first instant messenger event is associated with at least a previously indexed third instant messenger event.

For example, if the first instant messenger event is not associated with a conversation identifier associated with the second instant messenger event, a determination of whether the first instant messenger event is associated with at least a previously indexed third instant messenger event may be made. Similar to the determination of whether the first instant messenger event was associated with the second instant messenger event, the determination of whether the first instant messenger event is associated with the third instant messenger event may be based, at least in part, on a relevance measure. In one such embodiment, the first instant messenger event may be associated with a conversation identifier associated with the third instant messenger event if the relevance measure exceeds a predetermined threshold value. The threshold value may comprise, for example, the same threshold value used to evaluate the relevance of the first instant messenger event to the second instant messenger event.

Certain captured, received, and/or identified instant messenger events may be unassociated with any previously indexed instant messenger events, conversations, and/or existing conversation identifiers. Accordingly, one embodiment may comprise generating a new conversation identifier if the identified first instant messenger event is unassociated with any previously indexed instant messenger event. The first instant messenger event may then be associated with the generated new conversation identifier.

The relevance of the first instant messenger event to at least the previously indexed second instant messenger event may be quantified by a relevance measure. The relevance measure may be determined by evaluating or comparing various aspects and/or components of the first and second instant messenger events. For example, in one embodiment, determining the relevance measure may comprise comparing a first display area identifier associated with the first instant messenger event with a second display area identifier associated with the second instant messenger event. A display area identifier may comprise, for example, a display window identifier, such as an instant messenger display window identifier. In one such embodiment, the relevance measure may exceed the threshold value if the first display area identifier matches the second display area identifier.

In one embodiment, if the first and second display area identifiers do not match, the relevance measure may be determined by comparing a first conversation roster associated with the first instant messenger event with a second conversation roster associated with the second instant messenger event. A conversation roster may comprise, for example, a plurality of conversation participant identifiers extracted from a display area title, such as a plurality of instant messaging names associated with participants to an instant messenger conversation. In one such embodiment, the relevance measure may exceed the threshold value if the first conversation roster matches the second conversation roster.

One embodiment may comprise determining an elapsed time between a first time associated with the first instant messenger event, and a second time associated with the second instant messenger event. For example, the elapsed time may comprise a time period between a first time that a first instant messenger message associated with the first instant messenger message was sent, and a second time that a second instant messenger message associated with the second instant messenger event was sent. In another embodiment, the elapsed time may be measured differently, such as by measuring the time passage between the receipt of a first instant messenger message and a time of sending of a second instant messenger message, or a time period between a first time of capture of the first instant messenger event and a second time of capture of the second instant messenger event. In one embodiment, the relevance measure may exceed the threshold value if the first conversation roster matches the second conversation roster and the elapsed time is lesser than a predetermined value. In one such embodiment, the elapsed time may be determined only if the first display area identifier does not match the second display area identifier.

The type of data associated with an instant messenger event may be used in one embodiment to help determine the relevance measure. For example, in one embodiment, determining the relevance measure may further comprise comparing a first data type associated with the first instant messenger event with a second data type associated with the second instant messenger event. For example, an instant messenger event may comprise a data type associated with a engineering design application configured to use an instant messenger application to communicate a specification of a design to another engineer, product designer, marketer, etc. If a first instant messenger event comprising the aforementioned engineering design application data type is identified, a data store may be searched for a previously indexed second instant messenger event comprising the same data type. If such a second instant messenger event is found, a relevance measure may be determined between the first and second instant messenger events. In one such embodiment, the relevance measure may exceed the threshold value if a first conversation roster associated with the first instant messenger event matches a second conversation roster associated with the second instant messenger event, and the first data type matches the second data type.

Instant messages, although frequently short or terse, may comprise a keyword. An instant messenger keyword may comprise, for example, a word, term or phrase that is repeatedly used in a particular instant message, an unusual or not often used word in an instant message, a foreign word in an instant message, a proper noun in an instant message, etc. In one embodiment, determining a relevance measure may further comprise comparing a first keyword associated with the first instant messenger event with a second keyword associated with the second instant messenger event. In one such embodiment, the relevance measure may exceed the threshold value if the first conversation roster matches the second conversation roster, and the first keyword matches the second keyword.

A wide variety of different suitable criteria, characteristics, components, and/or attributes of instant messenger events may be used by different embodiments to determine a relevance measure between instant messenger events, and/or to associate instant messenger events with new or existing conversations, conversation identifiers, and/or conversation threads. For example, in one embodiment, a relevance measure may be determined based, at least in part, by comparing a plurality of the different criteria discussed above. In one such embodiment, a relevance measure may be determined by comparing a first keyword, a first conversation roster, and a first data type associated with a first instant messenger event with a second keyword, a second conversation roster, and a second data type, respectively, associated with a second instant messenger event.

Often, an instant messenger conversation may take place between two entities. However, certain instant messenger conversations may take place between more than two entities. Also, certain instant messenger conversations may involve entities that joined the conversation after it began, entities that left the conversation before it concluded, entities that left a conversation and later rejoined the same conversation, and/or entities that joined a conversation after it began and left before it concluded. To account for, and keep track of these additional and/or departing instant messenger conversation participants, one method according to the present invention may further comprise identifying a conversation participant identifier signal, and modifying the second conversation roster associated with the previously indexed second instant messenger event and/or a conversation identifier in response. Conversation participant identifier signals may comprise, for example, an additional conversation participant's identity, a departing conversation participant's identity, and/or a reference to a conversation identifier associated with the second instant messenger event.

Figure 2:
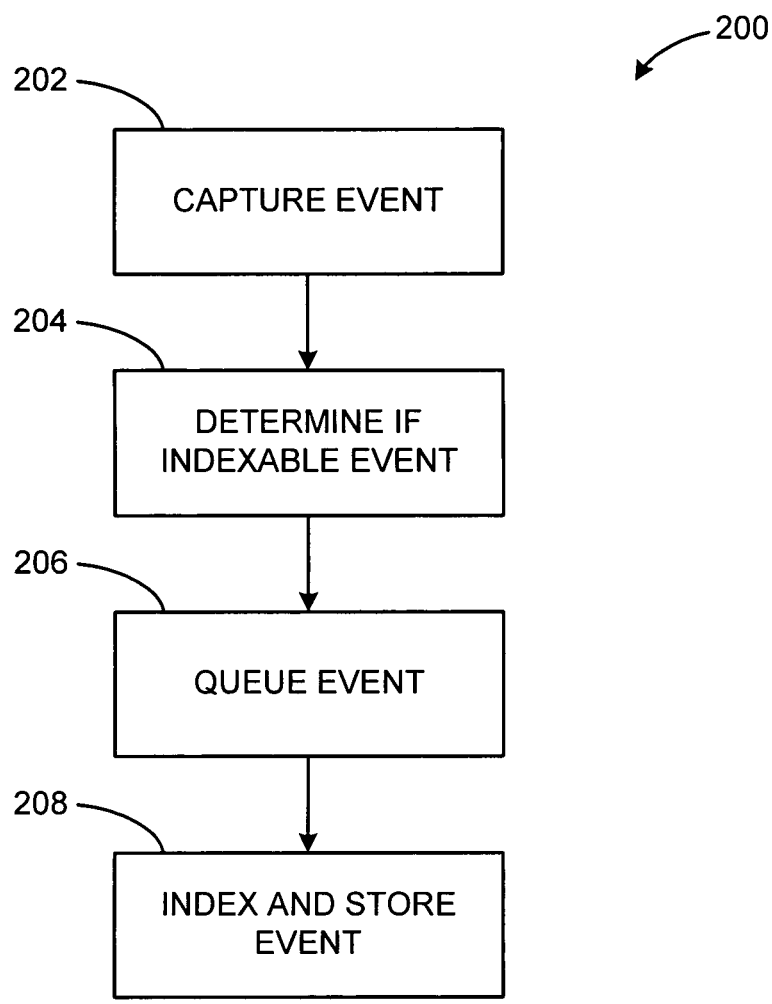
FIG. 2 is a flow diagram illustrating a method of capturing and processing event data associated with a client device in one embodiment of the present invention.

FIG. 2 illustrates a method 200 that provides a method for capturing and processing an event. This method is provided by way of example, as it will be appreciated from the foregoing description of illustrative embodiments there are a variety of ways to carry out methods in other embodiments of the present invention. The method 200 shown in FIG. 2 can be executed or otherwise performed by any of various systems. The method 200 is described below as carried out by the system 100 shown in FIG. 1 by way of example, and various elements of the system 100 are referenced in explaining the example method of FIG. 2.

As shown in 202, the capture processor 124 captures an event. The event can be a real-time event or can be a historical event. The capture processor 124 can capture a real-time event by identifying and compiling event data associated with the event upon the occurrence of the event. The capture processor 124 can capture a historical event, for example, by periodically crawling the memory 108 or associated data storage device of the client device 112a for previously uncaptured articles or receiving articles or data from client applications and identifying and compiling event data associated with the event. The capture processor 124 may have separate capture components for each client application, network monitoring, performance data capture, keystroke capture, and display capture. In one embodiment, the capture component can use a generalized event definition mechanism, such as an, event schema that it has previously defined and registered with the client device 102a, to capture or express the event.

Figure 3:
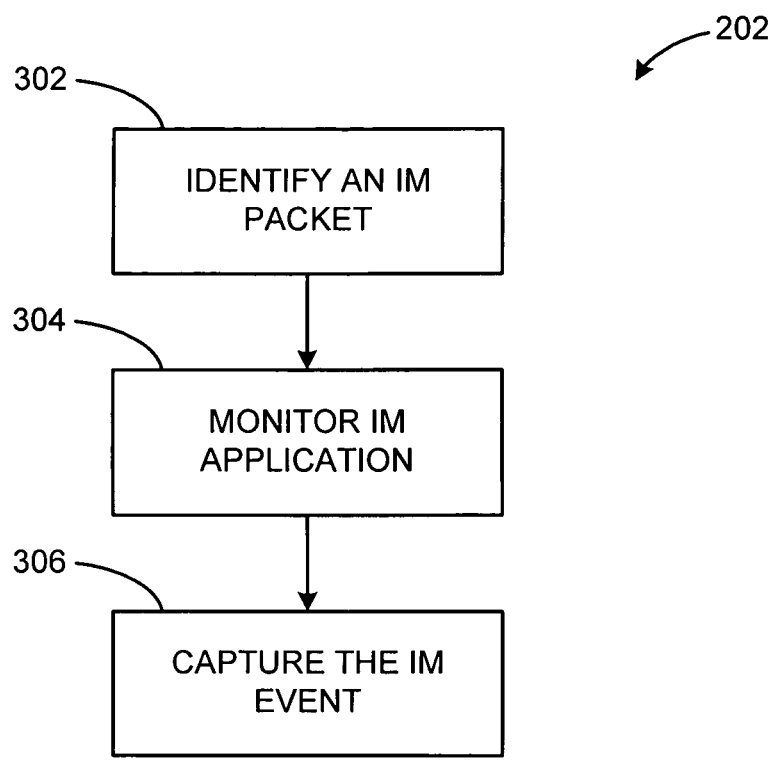
FIG. 3 is a flow diagram illustrating a method of identifying an instant messenger event in one embodiment of the present invention.

FIG. 3 illustrates a method 202 for identifying an instant messenger event. As shown in 302, an instant messenger capture component identifies an instant messenger activity. An instant messenger activity can be any suitable activity that indicates that an instant message has been sent or received by an instant messenger application or that the instant messenger application is active on the client device. For example, an instant messenger activity can comprise instant message network activity, such as the receipt or sending of an instant messenger packet. In one embodiment, the instant messenger capture component can monitor instant messenger network activity, such as packets sent and received by the client device 112a to or from the network 106, and can identify instant messenger network activity. Instant messenger network activity, such as instant messenger packets, can be identified by a port on the client device associated with the packet(s) or by a header or signature contained in the packet(s). A single instant messenger message may be split across multiple packets. The identification of instant messenger network activity, such as an instant messenger packet, can indicate that the instant messenger application is in use. Alternatively, the capture components can examine the client device for network ports that are in listening mode to determine the presence of an active instant messenger application.

Other types of instant messenger activity can be used to determine that the instant messenger application is in use. For example, the instant messenger capture component can determine that the instant messenger application is active by examining the instant messenger application in memory, such as by detecting the presence of an application with an instant messenger class name, detecting the presence of an instant messenger display area output to the display of the client device, detecting that a display area associated with the instant messenger application is active or detecting any other suitable change in the client device user interface associated with the instant messenger application.

After the identification of instant messenger activity, as shown in 304, the instant messenger capture component can identify an instant messenger event, such as, for example, the receipt of an instant messenger message, the sending of an instant messenger message, or entering text to compose an instant messenger message. The instant messenger capture component can identify an instant messenger event by analyzing or monitoring the instant messenger application. In one embodiment, the instant messenger capture component can monitor the instant messenger application for an ongoing period of time to identify an instant messenger event or events or can analyze the current state of the instant messenger application to identify an instant messenger event or events.

In one embodiment, the instant messenger capture component can identify or locate a display area associated with the instant messenger application and determine the content of the display area, such as a display window. The instant messenger capture component can, in one embodiment, monitor operating system calls made by the instant messenger application to display text to determine the content of the display area. In another embodiment, the instant messenger capture component can hook into the instant messenger application's notification application program interface (API) to determine the content of the display area. In another embodiment, the instant messenger capture component can directly query the instant messenger application for the content of the display area. The instant messenger capture component can also extract text from the display area to determine the content of the display area. In one embodiment, the instant messenger capture component can analyze visual aspects of the instant messenger application, such as a bitmap, to extract text from it using, for example, optical character recognition.

The instant messenger capture component can monitor logs generated by the instant messenger application and/or monitor keystrokes entered into the instant messenger application to determine the content of the instant messenger application. In the embodiment shown in FIG. 1, for example, the instant messenger capture component resides on the client device and captures the instant messenger event on the client device. In another embodiment, the instant messenger capture component can be on a network device, such as a server, and the instant messenger event can be captured, indexed and/or stored on the network device.

As shown in 306, the instant messenger capture component can capture the extracted event data associated with the instant messenger event. In one embodiment, the instant messenger capture component can use an event schema to express the event data. For example, the event schema for an instant messenger event can include one or more of sender information, recipient information, a time that the message was sent or received, a date that the message was sent or received, a file associated with the message, and the content of the message. The event schema can also contain a conversation identifier. As explained above, a conversation identifier can indicate a particular conversation that an instant message is associated with. The conversation identifier can be provided by the instant messenger application. Alternatively, the conversation identifier can be generated by the instant messenger capture component or an indexer. A conversation can end with a user logging out or closing the instant messenger application or the instant messenger application being inactive for a period of time. In one embodiment, the instant messenger capture component can determine if instant messenger messages are part of the same conversation based on some or all of the recipient(s) and sender of the messages, the time in between receipt or sending of messages, and whether messages are in the same instant messenger application display area. For example, if user 112a sends a message to a user B and then receives a message from user B two minutes later, the instant messenger capture component can associate the two messages with the same conversation and assign each a common or similar conversation identifier.

The instant messenger capture component can compile an event upon the receipt or sending of an instant messenger message. Alternatively, the instant messenger capture component can compile an event after a predetermined amount of time (for example, two minutes) from the receipt or sending of a message or from the last instant messenger event. In another embodiment, the instant messenger capture component can compile an event after a period of inactivity. The period of inactivity can vary based on the particular user or can be a predefined period of time.

Returning to FIG. 2, as shown in 204, the capture processor 124 determines whether the event captured is an indexable event. As explained above, some real-time events may not be indexed (non-indexable real-time events). In one embodiment, non-indexable real-time events may be used to update the current user state and are, for example, examining a portion of an article, changing an article, and closing an article. In this embodiment, non-indexable events are not indexed or sent for storage by the indexer 130. Indexable events can be indexable real-time events or historical events.

If an indexable event is determined, then, as shown in 206, the event can be sent by the capture processor 124 to the queue 126 with an indication that it is an indexable event. In the embodiment shown in FIG. 1, indexable real-time events are sent to both a user state queue and an index queue within queue 126 and historical events are sent to the index queue within the queue 126. Alternatively, indexable real-time events may not be sent to the user state queue to save computational time. The capture processor 124 can send the event in a form described by an event schema to the queue 126. If the event is determined to be a non-indexable event, then, as shown in 206, the non-indexable event can be sent by the capture processor 124 to the user state queue of the queue 126 with an indication that it is not to be indexed.

In one embodiment, the queue 126 may hold the event until a condition is met, such as the search engine is ready to receive it. Based on the event data, the event can be prioritized on the queue 126 for handling. For example, historical events may be given a lower priority for processing by the queue 126 than real-time events. In one embodiment, when the indexer 130 is ready to process another event, it can retrieve an event or events from the index queue in the queue 126. The query system 132 can retrieve an event or events from the user state queue of the queue 126, when it is ready to update the user state. Another embodiment may not use a queue, and events may be sent directly to the search engine 122 from the capture processor 124.

As shown in 208, the indexer 130 indexes and stores the event. The indexer 130 can retrieve an event from the queue 126 when it is ready to process the event. In one embodiment, the indexer 130 may determine if the event is a duplicate event, and if not may assign an Event identifier to the event. The indexer 130 can also associate the event with related events. In the embodiment shown in FIG. 2, the indexer determines indexable terms associated with the event, dates and times associated with the event, and other data associated with the event from the event schema. The indexer 130 can associate the Event identifier with the indexable terms that are contained in the index 142. The event can be stored in the database 144 and the content of the event can be stored in the repository 146.

Figure 4:
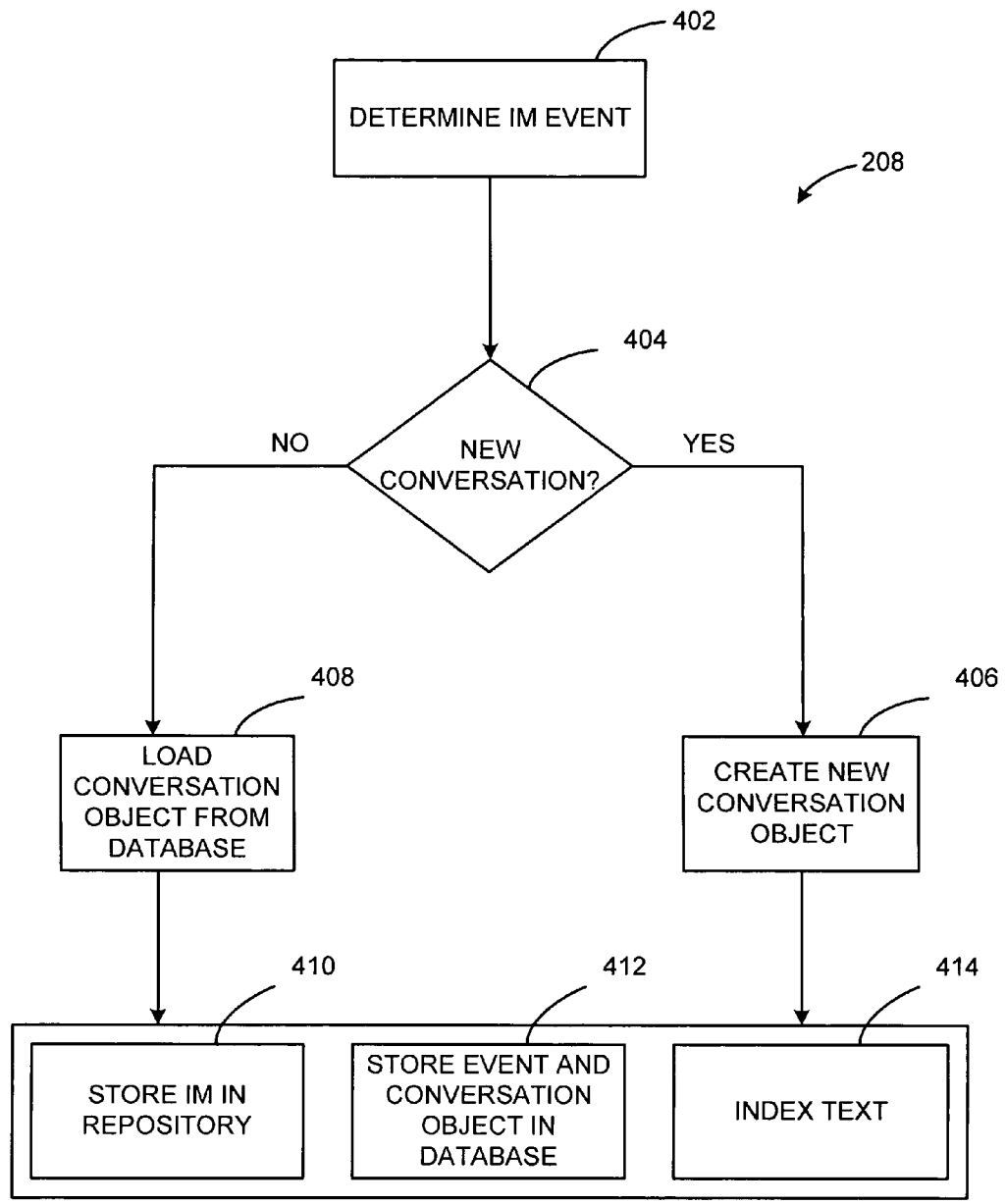
FIG. 4 is a flow diagram illustrating a method of indexing an instant messenger event in one embodiment of the present invention.

FIG. 4 illustrates a method 210 for indexing an instant messenger event. As shown in 402, the indexer 130 retrieves an instant messenger event from the queue 126 and determines that the event is an instant messenger event. In one embodiment, the indexer 130 can determine if the retrieved instant messenger event is a duplicate of a previously processed instant messenger event, and if not can assign the instant messenger event an event identifier. The indexer 130 can also parse out indexable terms, including sender and recipient names, times and dates associated with the event, and a display area identifier from the event schema. In one embodiment, the indexer 130 may determine a title associated with an instant messenger conversation. The indexer 130 can determine the title based on the frequency of unique terms appearing in the conversation, the first sentence of the conversation, or the participants and time of the conversation. For example, the indexer 130 can select the first sentence in the first message of the conversation and associate that sentence as the title of the conversation. In another embodiment, the query system or other component can do this in a post-processing phase.

As shown in 404, the indexer 130 determines whether to associate the identified the instant messenger event with a new conversation or with a previously indexed instant messenger event and/or conversation identifier. As explained above, the identified instant messenger event can have a display area identifier associated with it. The indexer 130 can compare the display area identifier with a display area identifier associated with a previously processed instant messenger event or events to determine if there is a match. In one embodiment, if no matching display area identifier exists, the indexer 130 can determine if the instant messenger event is associated with an existing conversation based on some or all of the recipient(s) and sender of the message, the time in between receipt or sending of the message and previous messages, content of the message and messages associated with a conversation, and whether the message is associated with the same instant messenger application display area as previous messages.

For example, if the indexer 130 has previously processed an instant messenger event where user 112*a* sent a message to a user B and is now processing an instant messenger event where user 112*a* receives a message from user B two minutes later after the first event, the indexer 130 can associate the two events with the same conversation. Additionally, if user A sends user B a number of messages in a row, these messages may be associated with the same conversation. In other embodiment, messages between multiple users, such as in a "chat room" can be associated with the same conversation, messages from a user to himself can be associated with the same conversation, and messages from a user to an automated service or computer can be associated with the same conversation.

If the indexer 130 determines that the instant messenger event should be associated with a new conversation, then the indexer, as shown in 406, can create a new conversation object. A conversation object can associate an instant messenger event with related instant messenger events from the same conversation. A conversation object may comprise a conversation object identifier (such as a conversation identifier). Conversations can also be associated with each other through an associated conversation thread.

If the indexer 130 determines that the instant messenger event should be associated with an existing conversation, then the indexer 130, as shown in 408, can load the relevant conversation object from the database 144 of the data store 140. By associating instant messenger events with a conversation, a user is able to search for and retrieve complete instant messenger conversations.

Once an event has been associated with a conversation object, and provided with a conversation object identifier, such as a conversation identifier, in the embodiment shown, the instant messenger event can be stored in the data store 140. As shown in 410, the instant messenger message is stored in the repository 146. In one embodiment, if the instant messenger application stores the conversation, a link or any suitable associated identifier for the location of the stored conversation can be stored in the data store associated with the event identifier. As shown in 412, the event and conversation object are stored in the database 144. As shown in 414, the indexable terms from the instant message are stored in the index 142. In one embodiment, the event identifier associated with the event is associated with terms in the index 142 that equate to the indexable terms of the event.

Figure 5:
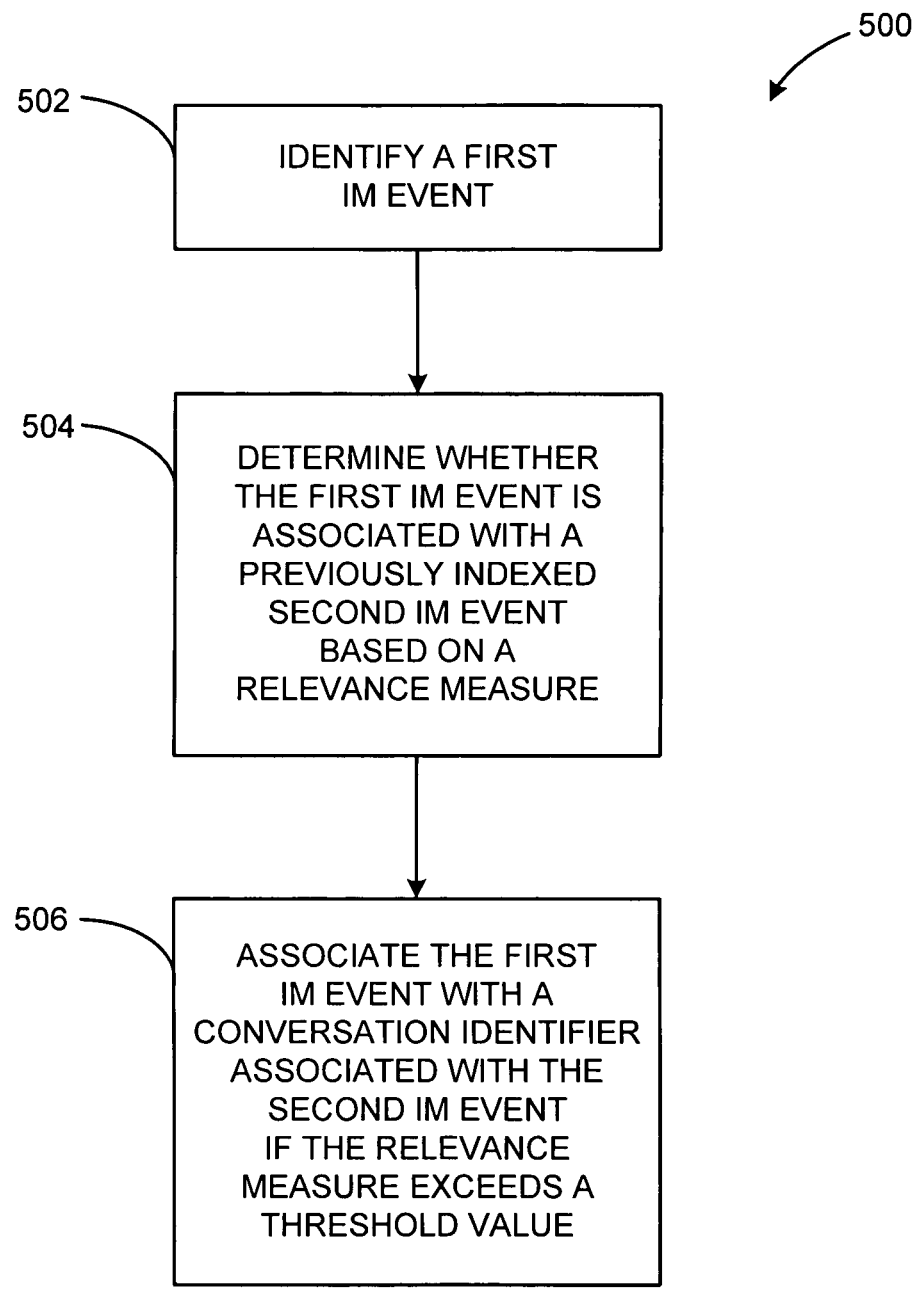
FIG. 5 is a flow diagram illustrating a method of associating instant messenger events in one embodiment of the present invention.

FIG. 5 is a flow diagram illustrating a method of associating instant messenger (IM) events in one embodiment of the present invention. FIG. 5 illustrates a method 500 for associating a first instant messenger event with a second instant messenger event, and/or a conversation identifier. As shown in 502, the indexer 130 identifies a first instant messenger event. The first instant messenger event may have been recently captured by the capture processor 124 and information associated therewith may have been output to the indexer 130. In one embodiment, the query system 132 may identify a previously indexed first instant messenger event in order to associate the previously indexed event with other instant messenger events it may be associated with and/or relevant to.

In some embodiments, the user 112*a* may be able to specify which instant messenger events the capture processor 124 captures, such as by specifying that only instant messenger events associated with instant messenger messages to or from a particular instant messenger "buddy" with which the user 112*a* regularly converses via instant messages should be captured. In another embodiment, the user 112*a* may set a criterion that allows all instant messenger events to be captured by the capture processor 124, but allows only those instant messenger events that satisfy the criterion to be indexed by the indexer 130. In yet another embodiment, the user 112*a* may set a criterion that permits the query system 132 to identify previously indexed instant messenger events in the data store 140 that were indexed during a particular time period. A criterion may alternatively or additionally be generated automatically based, at least in part, on the past preferences, activities, and proclivities of the user 112*a*. Examples of criteria comprise when an instant message associated with the instant messenger event was sent or received, who sent such an instant message, where the client device that sent such an instant message is physically located, how such an instant message was transmitted, etc.

As shown in 504, the query system 132 determines whether the first instant messenger event is associated with at least a previously indexed second instant messenger event based, at least in part, on a relevance measure. The relevance measure may comprise, for example, a quantification of how relevant the first instant messenger event is to the second instant messenger event, and/or a conversation identifier associated with the second instant messenger event. The relevance measure may be determined using a variety of different methods. For example, in one embodiment, a first display area identifier, such as an instant messenger window name, associated with the first instant messenger event may be compared with a second display area identifier associated with the second instant messenger event. A match between display area identifiers may indicate that the two instant messenger events took place in the same instant messenger display area, are relevant to one another, and should be associated with each other and a common conversation identifier. Other aspects, attributes, and information associated with an instant messenger event may be used to determine a relevance measure, such as, for example, conversation rosters, data types, keywords, and conversation participant identifier signals.

In one embodiment, if the first and second display area identifiers do not match, a first conversation roster associated with the first instant messenger event may be compared with a second conversation roster associated with the second instant messenger event. A conversation roster may comprise a plurality of conversation participant identifiers, such as a list of the entities involved with a particular instant messenger event, such as the sender of an associated instant messenger message, and the recipient of that instant messenger message. In one embodiment, the indexer 130 may determine a conversation roster comprising a plurality of conversation participant identifiers by extracting a title from a display area, such as an instant messenger application window, that is associated with an instant messenger event.

A conversation identifier may have a particular conversation roster associated therewith. For example, in one embodiment a conversation roster associated with the most recently indexed instant messenger event associated with the conversation identifier may comprise the sole conversation roster presently associated with that conversation identifier. In one embodiment, if another instant messenger event (such as the first instant messenger event identified as shown in 502), is subsequently associated with the conversation identifier, the first conversation roster associated with the first instant messenger event may become the sole conversation roster associated with the conversation identifier.

In another embodiment, the search engine 122 may receive a conversation participant identifier signal. The conversation participant identifier signal may comprise, for example, the identity of an additional participant to a conversation associated with a particular conversation identifier. A conversation participant identifier signal may additionally, or alternatively, comprise an identity of a departing participant of the conversation associated with the conversation identifier. In response to receiving a conversation participant identifier signal, the search engine 122 may instruct the indexer 130 to modify a conversation roster associated with a conversation identifier. In order to facilitate a modification of an appropriate conversation roster, in one embodiment, a conversation participant identifier signal may comprise a reference to a particular conversation identifier associated with the appropriate conversation roster in the data store 140, such as the conversation identifier associated with the previously indexed second instant messenger event and the second conversation roster.

The elapsed time between times associated with instant messenger events may be of importance in associating instant messenger events with each other, and/or with the correct conversation identifier or identifiers. For example, in one embodiment an elapsed time may be determined, wherein the elapsed time comprises a measure of time between a first time associated with the first instant messenger event, and a second time associated with the second instant messenger event. A time associated with an instant messenger event may comprise, for example, a time an instant messenger message was sent, a time an instant messenger message was received, or a time the instant messenger event was captured. In one embodiment, although the first and second display area identifiers may not match, the relevance measure may exceed a threshold value when the first conversation roster matches the second conversation roster, and the determined elapsed time between the time the first time and the second time is less than a predetermined value. Such a relevance measure may indicate that, although the two instant messenger events are associated with two respective instant messenger messages that did not occur in the same instant messenger display area, they involved the same participants, occurred close in time together, and therefore may be relevant to one another and comprise a conversation.

In another embodiment, the association of a common keyword with two separate instant messenger events may contribute to a relevance measure between the two instant messenger events that exceeds the threshold value. For example a first instant messenger event may be associated with a first instant messenger message comprising the term "Hulk." A second instant messenger event comprising a different display area identifier than the first instant messenger event, but the same conversation roster may be associated with a second instant messenger message also comprising the term "Hulk." The association of the same keyword with the two instant messenger events, along with the match of the first and second conversation rosters may cause the relevance measure to exceed the threshold value. In another such embodiment, the elapsed time between a first time the first instant messenger message was received by an entity and a second time the second instant messenger event was sent by the same entity may be determined, and the relevance measure may exceed the threshold value if the first and second conversation rosters match, and at least one of the elapsed time is lesser than a predetermined value, and the first and second instant messenger events comprise the same keyword.

A data type common to two separate instant messenger events may also be used to associate them with a common conversation identifier. For example, an instant messenger event may comprise a data type associated with a long distance chess game application configured to use an instant messenger application to communicate a move of a first player's chess piece to an opponent second player. If a first instant messenger event comprising the aforementioned chess game application data type is identified, the query system 132 may search the data store 140 for a previously indexed second instant messenger event comprising the same data type. If such a second instant messenger event is found, the indexer 130 may determine a relevance measure between the first and second instant messenger events. In one embodiment, even though the first and second instant messenger events may not have matching display area identifiers, the first instant messenger event may be associated with the second instant messenger event if the two events have matching conversation rosters, and the first instant messenger event comprises a first data type that matches a second data type associated with the second instant messenger event.

As shown in 506, if the relevance measure exceeds a threshold value, the indexer 130 associates the first instant messenger event with a conversation identifier associated with the previously indexed second instant messenger event. For example, in one embodiment, the relevance measure may exceed the threshold value when a first display area identifier associated with the first instant messenger event matches a second display area identifier associated with the second instant messenger event. In another embodiment, the relevance measure may exceed the threshold value when the first and second conversation rosters match, and the elapsed time is lesser than a predetermined value.

One embodiment of the present invention may comprise determining whether the first instant messenger event is associated with a plurality of previously indexed instant messenger events and/or conversation identifiers. In one such embodiment, if the relevance measure between the first and second instant messenger events does not meet or exceed the threshold value, the indexer 130 may determine whether the first instant messenger event is associated with at least a previously indexed third instant messenger event. Such a determination may also be made based, at least in part, on a relevance measure. In one such embodiment, if the relevance measure between the first instant messenger event and the previously indexed third instant messenger event exceeds the threshold value, the first instant messenger event may be associated with a conversation identifier associated with the third instant messenger event.

As such, the query system 132 may continue to attempt to identify conversations, conversation identifiers and/or previously indexed instant messenger events in the data store 140 to which an identified first instant messenger event may be relevant. If the indexer 130 is unable to associate a first instant messenger event with any conversation identifier or previously indexed instant messenger event in the data store 140, the indexer 130 may generate a new conversation identifier, and associate the first instant messenger event with the new conversation identifier.

The capturing of instant messenger message events that are indexed and stored by the search engine 122 may allow the user 112a to search for and retrieve instant messenger messages on the client device 102a and may allow the search engine to automatically search for instant messenger messages on the client device 102a. Indexing instant messenger events while they happen without waiting for the end of the conversation may provide the user with access to the event data before the end of the conversation.

The environment shown reflects a client-side search engine architecture embodiment. Other embodiments are possible, such as a stand-alone client device or a network search engine.

General

The foregoing description of embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

That which is claimed:

1. A computer-implemented method comprising:
   identifying a first instant messenger event;
   identifying a display area of a graphical user interface, the display area having a first display area identifier;
   responsive to identifying the display area of the graphical user interface, comparing the first display area identifier associated with the first instant messenger event with a second display area identifier associated with a previously indexed second instant messenger event;
   associating the first instant messenger event with a conversation identifier associated with the second instant messenger event if the first and second display area identifiers match;
   determining an elapsed time if the first and second display area identifiers do not match, wherein the elapsed time comprises a time period between a first time associated with the first instant messenger event, and a second time associated with the second instant messenger event.
   comparing a first conversation roster associated with the first instant messenger event with a second conversation roster associated with the second instant messenger event;
   associating the first instant messenger event with the conversation identifier if the first and second conversation rosters match and the elapsed time is less than a predetermined value;
   indexing the first instant messenger event if it is associated with the conversation identifier, wherein indexing the first instant messenger event comprises storing event data associated with the first instant messenger event in a data store; and
   generating a new conversation identifier and associating the first instant messenger event with the new conversation identifier if the first instant messenger event is unassociated with any previously indexed instant messenger event.

2. The method of claim 1, wherein the first display area identifier comprises a name of an instant messenger window associated with the first instant messenger event, and the second display area identifier comprises a name of an instant messenger window associated with the second instant messenger event.

3. The method of claim 1, wherein identifying the first instant messenger event comprises receiving the first instant messenger event.

4. The method of claim 1, wherein identifying the first instant messenger event comprises identifying that the first instant messenger event has been previously indexed.

5. The computer-implemented method of claim 1, further comprising:
comparing a first data type associated with the first instant messenger event with a second data type associated with the second instant messenger event, where the first data type and the second data type are used by applications communicating using instant messaging;
determining a relevance measure between the first instant messenger event and the second instant messenger event, based at least in part on the comparison; and
associating the first instant messenger event with the conversation identifier if the first conversation roster matches the second conversation roster, the elapsed time is less than a predetermined value, and the relevance measure is above a predetermined value.

6. The method of claim 1, wherein at least one of the first conversation roster and the second conversation roster comprises a plurality of conversation participant identifiers extracted from a display area title.

7. The method of claim 1, further comprising:
identifying a conversation participant identifier signal, and modifying the second conversation roster in response.

8. A non-transitory computer-readable storage medium comprising executable program code, the program code comprising:
program code for identifying a first instant messenger event;
program code for identifying a display area of a graphical user interface, the display area having a first display area identifier;
program code for comparing the first display area identifier associated with the first instant messenger event with a second display area identifier associated with a previously indexed second instant messenger event, responsive to identifying the display area of the graphical user interface;
program code for associating the first instant messenger event with a conversation identifier associated with the second instant messenger event if the first and second display area identifiers match;
program code for determining an elapsed time if the first and second display area identifiers do not match, wherein the elapsed time comprises a time period between a first time associated with the first instant messenger event, and a second time associated with the second instant messenger event;
program code for comparing a first conversation roster associated with the first instant messenger event with a second conversation roster associated with the second instant messenger event;
program code for associating the first instant messenger event with the conversation identifier if the first and second conversation rosters match and the elapsed time is less than a predetermined value;
program code for indexing the first instant messenger event if it is associated with the conversation identifier, wherein indexing the first instant messenger event comprises storing event data associated with the first instant messenger event in a data store; and
program code for generating a new conversation identifier and associating the first instant messenger event with the new conversation identifier if the first instant messenger event is unassociated with any previously indexed instant messenger event.

9. The computer-readable storage medium of claim 8, wherein the first display area identifier comprises a name of an instant messenger window associated with the first instant messenger event, and the second display area identifier comprises a name of an instant messenger window associated with the second instant messenger event.

10. The computer-readable storage medium of claim 8, wherein identifying the first instant messenger event comprises receiving the first instant messenger event.

11. The computer-readable storage medium of claim 8, wherein identifying the first instant messenger event comprises identifying that the first instant messenger event has been previously indexed.

12. The computer-readable storage medium of claim 8, the program code further comprising:
program code for comparing a first data type associated with the first instant messenger event with a second data type associated with the second instant messenger event, where the first data type and the second data type are used by applications communicating using instant messaging;
program code for determining a relevance measure between the first instant messenger event and the second instant messenger event, based at least in part on the comparison; and
program code for associating the first instant messenger event with the conversation identifier if the first conversation roster matches the second conversation roster, the elapsed time is less than a predetermined value, and the relevance measure is above a predetermined value.

13. The computer-readable storage medium of claim 8, wherein at least one of the first conversation roster and the second conversation roster comprises a plurality of conversation participant identifiers extracted from a display area title.

14. The computer-readable storage medium of claim 8, further comprising:
identifying a conversation participant identifier signal, and modifying the second conversation roster in response.

15. A computer system, comprising:
a computer processor; and
a non-transitory computer-readable storage medium comprising program code executable by the processor, the program code comprising
program code for identifying a first instant messenger event;
program code for identifying a display area of a graphical user interface, the display area having a first display area identifier;
program code for comparing the first display area identifier associated with the first instant messenger event with a second display area identifier associated with a previously indexed second instant messenger event, responsive to identifying the display area of the graphical user interface;
program code for associating the first instant messenger event with a conversation identifier associated with the second instant messenger event if the first and second display area identifiers match;
program code for determining an elapsed time if the first and second display area identifiers do not match, wherein the elapsed time comprises a time period between a first time associated with the first instant messenger event, and a second time associated with the second instant messenger event;
program code for comparing a first conversation roster associated with the first instant messenger event with a second conversation roster associated with the second instant messenger event;

program code for associating the first instant messenger event with the conversation identifier if the first and second conversation rosters match and the elapsed time is less than a predetermined value;

program code for indexing the first instant messenger event if it is associated with the conversation identifier, wherein indexing the first instant messenger event comprises storing event data associated with the first instant messenger event in a data store; and program code for generating a new conversation identifier and associating the first instant messenger event with the new conversation identifier if the first instant messenger event is unassociated with any previously indexed instant messenger event.

16. The computer system of claim 15, wherein the first display area identifier comprises a name of an instant messenger window associated with the first instant messenger event, and the second display area identifier comprises a name of an instant messenger window associated with the second instant messenger event.

17. The computer system of claim 15, wherein identifying the first instant messenger event comprises receiving the first instant messenger event.

18. The computer system of claim 15, wherein identifying the first instant messenger event comprises identifying that the first instant messenger event has been previously indexed.

19. The computer system of claim 15, the program code further comprising:

program code for comparing a first data type associated with the first instant messenger event with a second data type associated with the second instant messenger event, where the first data type and the second data type are used by applications communicating using instant messaging;

program code for determining a relevance measure between the first instant messenger event and the second instant messenger event, based at least in part on the comparison; and program code for associating the first instant messenger event with the conversation identifier if the first conversation roster matches the second conversation roster, the elapsed time is less than a predetermined value, and the relevance measure is above a predetermined value.

20. The computer system of claim 15, wherein at least one of the first conversation roster and the second conversation roster comprises a plurality of conversation participant identifiers extracted from a display area title.

* * * * *